United States Patent
Fouda et al.

(10) Patent No.: US 11,408,272 B2
(45) Date of Patent: Aug. 9, 2022

(54) MUD ANGLE DETERMINATION FOR ELECTROMAGNETIC IMAGER TOOLS

(71) Applicant: HALLIBURTON ENERGY SERVICES, INC., Houston, TX (US)

(72) Inventors: Ahmed E. Fouda, Spring, TX (US); Baris Guner, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 39 days.

(21) Appl. No.: 16/872,553

(22) Filed: May 12, 2020

(65) Prior Publication Data

US 2021/0355812 A1     Nov. 18, 2021

(51) Int. Cl.
*E21B 47/0228*     (2012.01)
*E21B 47/002*     (2012.01)
*G01V 3/12*     (2006.01)

(52) U.S. Cl.
CPC ...... *E21B 47/0228* (2020.05); *E21B 47/0025* (2020.05); *G01V 3/12* (2013.01)

(58) Field of Classification Search
CPC ............... E21B 47/024; E21B 47/0228; E21B 47/022; E21B 47/02; E21B 47/0025; E21B 47/002; G01V 3/12
USPC .................................................. 324/323–375
See application file for complete search history.

(56) References Cited

U.S. PATENT DOCUMENTS

| | | | | |
|---|---|---|---|---|
| 5,899,958 A * | 5/1999 | Dowell | ................... | E21B 47/26 702/6 |
| 7,725,263 B2 * | 5/2010 | Sugiura | ................. | E21B 47/022 175/45 |
| 8,200,437 B2 * | 6/2012 | Davydycheva | .......... | G01V 3/28 702/6 |
| 8,497,685 B2 * | 7/2013 | Sugiura | ................. | E21B 47/024 324/345 |
| 8,866,483 B2 * | 10/2014 | Bittar | ....................... | G01V 3/24 324/374 |
| 9,464,482 B1 * | 10/2016 | Bargach | .................. | E21B 7/068 |

(Continued)

FOREIGN PATENT DOCUMENTS

| | | | | |
|---|---|---|---|---|
| CA | 2687242 A1 * | 12/2008 | .......... | E21B 47/022 |
| CA | 2860395 A1 * | 7/2013 | ............. | E21B 47/00 |

(Continued)

OTHER PUBLICATIONS

International Search Report, Response and Written Opinion, PCT Application No. PCT/US2020/037417, dated Jan. 29, 2021.

*Primary Examiner* — Jay Patidar
*Assistant Examiner* — Sean Curtis
(74) *Attorney, Agent, or Firm* — Novak Druce Carroll LLP

(57) ABSTRACT

Aspects of the subject technology relate to systems and methods for identifying a mud angle associated with an electromagnetic imager tool based on tool measurements made during operation of the electromagnetic imager tool. Tool measurements made by an electromagnetic imager tool operating to log a wellbore in a formation can be gathered. The tool measurements can be decomposed into two quantities along a plurality of candidate mud angles for the electromagnetic imager tool. As follows, a mud angle associated with the electromagnetic imager tool can be identified from the plurality of candidate mud angles based on an amount of correlation between the two quantities for each of the plurality of candidate mud angles.

18 Claims, 11 Drawing Sheets

(56) References Cited

U.S. PATENT DOCUMENTS

| | | | | |
|---|---|---|---|---|
| 9,885,805 | B2* | 2/2018 | Hayman | G01V 3/20 |
| 11,243,325 | B2* | 2/2022 | Donderici | G01V 3/24 |
| 2008/0294343 | A1* | 11/2008 | Sugiura | E21B 47/022 |
| | | | | 702/6 |
| 2008/0294344 | A1* | 11/2008 | Sugiura | E21B 47/024 |
| | | | | 324/207.13 |
| 2011/0199090 | A1* | 8/2011 | Hayman | E21B 47/085 |
| | | | | 324/356 |
| 2011/0204897 | A1* | 8/2011 | Hu | G01V 3/24 |
| | | | | 324/351 |
| 2014/0184229 | A1* | 7/2014 | Bloemenkamp | G01V 3/24 |
| | | | | 324/369 |
| 2014/0347056 | A1* | 11/2014 | Hayman | G01V 3/20 |
| | | | | 324/355 |
| 2015/0008927 | A1 | 1/2015 | Cheung et al. | |
| 2015/0185354 | A1* | 7/2015 | Hayman | E21B 47/085 |
| | | | | 324/355 |
| 2015/0355372 | A1 | 12/2015 | Bloemenkamp et al. | |
| 2018/0203150 | A1 | 7/2018 | San Martin et al. | |
| 2020/0116884 | A1* | 4/2020 | Weng | E21B 47/0025 |
| 2021/0048546 | A1* | 2/2021 | Wang | G01V 1/284 |
| 2021/0048553 | A1* | 2/2021 | Guner | G01V 3/38 |
| 2021/0048554 | A1* | 2/2021 | Guner | G01V 3/20 |
| 2021/0055449 | A1* | 2/2021 | Guner | G01V 3/34 |
| 2021/0230998 | A1* | 7/2021 | Chen | E21B 7/04 |
| 2021/0256671 | A1* | 8/2021 | Guner | G06N 3/086 |
| 2021/0340860 | A1* | 11/2021 | Guner | E21B 47/0228 |
| 2021/0355812 | A1* | 11/2021 | Fouda | G01V 3/30 |

FOREIGN PATENT DOCUMENTS

| | | | | | |
|---|---|---|---|---|---|
| CA | | 2820658 | A1 * | 7/2014 | E21B 47/022 |
| CA | | 2687242 | C * | 7/2018 | E21B 47/022 |
| CN | | 1764851 | A * | 4/2006 | G01V 3/28 |
| EP | | 1995406 | A1 * | 11/2008 | E21B 47/024 |
| EP | | 2182393 | A1 * | 5/2010 | E21B 47/082 |
| EP | | 2156221 | B1 * | 4/2016 | E21B 47/022 |
| WO | WO-2008147505 | | A1 * | 12/2008 | E21B 47/022 |
| WO | | 2019088998 | A1 | 5/2019 | |
| WO | WO-2019190532 | | A1 * | 10/2019 | E21B 47/002 |
| WO | WO-2020081130 | | A1 * | 4/2020 | E21B 47/0002 |
| WO | WO-2020086874 | | A1 * | 4/2020 | E21B 21/00 |
| WO | WO-2020101653 | | A1 * | 5/2020 | E21B 47/0025 |
| WO | WO-2020101692 | | A1 * | 5/2020 | E21B 47/0025 |
| WO | WO-2020231411 | | A1 * | 11/2020 | E21B 47/0025 |
| WO | WO-2021221702 | | A1 * | 11/2021 | E21B 47/0025 |
| WO | WO-2021230893 | | A1 * | 11/2021 | E21B 47/0025 |

* cited by examiner

MUD ANGLE DETERMINATION FOR ELECTROMAGNETIC IMAGER TOOLS

TECHNICAL FIELD

The present technology pertains to identifying a mud angle associated with an electromagnetic imager tool, and more particularly, to identifying a mud angle associated with an electromagnetic imager tool based on tool measurements made during operation of the electromagnetic imager tool.

BACKGROUND

Electromagnetic imager tools have been developed for generating images downhole in wellbores. Specifically, electromagnetic imager tools have been developed to operate in drilling mud to image formations surrounding a wellbore. Electromagnetic imager tools are subject to the mud effect. The mud effect refers to the contribution of the mud to measured impedance. This effect is particularly severe if a formation exhibits low resistivity and/or the distance between the pad's outer surface and the borehole wall, e.g. the formation, is high. Techniques have been developed in order to remove or otherwise minimize the mud effect in an electromagnetic imager tool operating to log a wellbore, e.g. as part of generating images of a surround formation of the wellbore. For example, the Z90 technique has been developed to remove the mud effect for electromagnetic imager tools.

Many of these techniques utilize mud angle in minimizing or otherwise removing the mud effect for electromagnetic imager tools. Mud angle, as used herein is the phase angle of a complex-valued mud impedance of an electromagnetic imager tool. The effectiveness of these techniques in removing the mud effect is strongly dependent on accuracy of an identified mud angle associated with an electromagnetic imager tool. In turn, this can ultimately affect quality and accuracy in images that are processed through these techniques to account for the mud effect. However, often times these techniques rely on inaccurate mud angle estimates to remove the mud effect thereby leading to errors in the application of these techniques. For example, inaccurate mud angle usage can lead to poor image quality and contrast in areas of an image affected by the mud effect. There therefore exist needs for systems and methods for accurately identifying a mud angle for an electromagnetic imager tool.

Actually measuring mud to identify properties of the mud is one way to identify mud angle. Specifically, an electromagnetic imager tool can be operated to just gather measurements of the mud, which can subsequently be used to identify a mud angle. However, this is an inefficient usage of the electromagnetic imager tool. Specifically, operating the electromagnetic imager tool to just take measurements of the mud wastes time during which the electromagnetic imager tool can be operated to actually log a wellbore. Further, the formation still makes contributions to the direct mud measurements, thereby leading to inaccurate mud angle estimates. Tools have been developed with a mud cell for directly measuring mud properties. However, such tools can require additional parts that may increase the cost of the tool while further complicating the tool design process.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
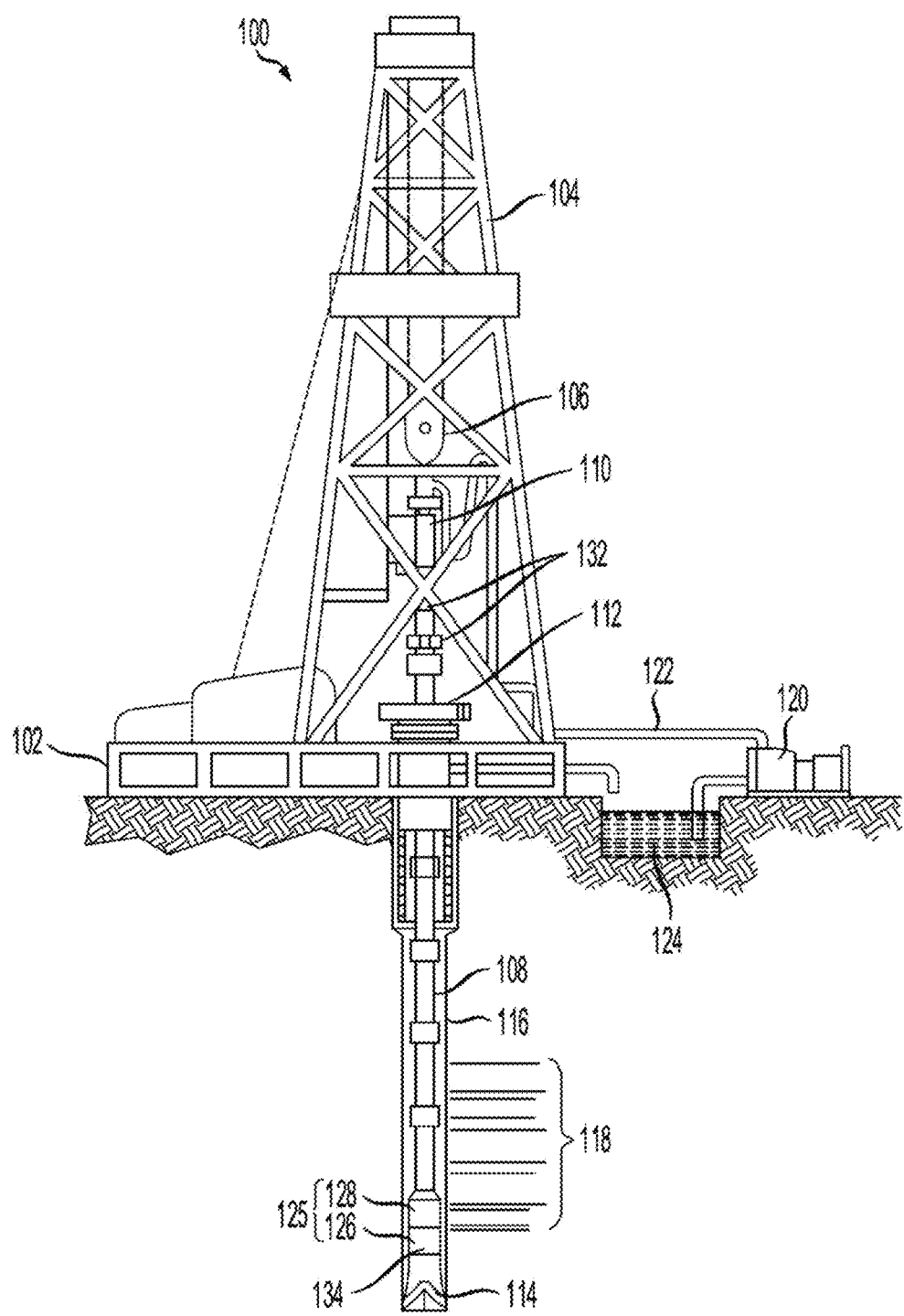
FIG. 1A is a schematic diagram of an example logging while drilling wellbore operating environment, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The disclosed technology addresses the foregoing by identifying a mud angle associated with an electromagnetic imager tool based on tool measurements made during operation of the electromagnetic imager tool. Specifically, a mud angle can be identified from a plurality of candidate mud angles based on correlation between two quantities decomposed from tool measurements made by an electromagnetic imager tool across the plurality of candidate mud angles.

In various embodiments, tool measurements made by an electromagnetic imager tool operating to log a wellbore in a formation can be gathered. The tool measurements can be decomposed into two quantities along a plurality of candidate mud angles for the electromagnetic imager tool. As follows, a mud angle associated with the electromagnetic imager tool can be identified from the plurality of candidate mud angles based on an amount of correlation between the two quantities for each of the plurality of candidate mud angles. Specifically, the identified mud angle can have a smallest amount of correlation between the two quantities across the plurality of candidate mud angles.

In various embodiments, a system can include one or more processors and at least one computer-readable storage medium storing instructions which, when executed by the one or more processors, cause the one or more processors to gather tool measurements made by an electromagnetic imager tool operating to log a wellbore in a formation. The instructions can also cause the one or more processors to decompose the tool measurements into two quantities along a plurality of candidate mud angles for the electromagnetic imager tool. Further, the instructions can cause the one or more processors to identify a mud angle associated with the electromagnetic imager tool from the plurality of candidate mud angles based on an amount of correlation between the two quantities for each of the plurality of candidate mud angles. Specifically, the identified mud angle can have a smallest amount of correlation between the two quantities across the plurality of candidate mud angles.

In various embodiments, a system can include a non-transitory computer-readable storage medium having stored therein instructions which, when executed by a processor, cause the processor to gather tool measurements made by an electromagnetic imager tool operating to log a wellbore in a formation. The instructions can also cause the processor to decompose the tool measurements into two quantities along a plurality of candidate mud angles for the electromagnetic imager tool. Further, the instructions can cause the processor to identify a mud angle associated with the electromagnetic imager tool from the plurality of candidate mud angles based on an amount of correlation between the two quantities for each of the plurality of candidate mud angles. Specifically, the identified mud angle can have a smallest amount of correlation between the two quantities across the plurality of candidate mud angles.

Turning now to FIG. 1A, a drilling arrangement is shown that exemplifies a Logging While Drilling (commonly abbreviated as LWD) configuration in a wellbore drilling scenario 100. Logging-While-Drilling typically incorporates sensors that acquire formation data. Specifically, the drilling arrangement shown in FIG. 1A can be used to gather formation data through an electromagnetic imager tool as part of logging the wellbore using the electromagnetic imager tool. The drilling arrangement of FIG. 1A also exemplifies what is referred to as Measurement While Drilling (commonly abbreviated as MWD) which utilizes sensors to acquire data from which the wellbore's path and position in three-dimensional space can be determined. FIG. 1A shows a drilling platform 102 equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, it creates a wellbore 116 that passes through various subterranean formations 118. A pump 120 circulates drilling fluid through a supply pipe 122 to top drive 110, down through the interior of drill string 108 and out orifices in drill bit 114 into the wellbore. The drilling fluid returns to the surface via the annulus around drill string 108, and into a retention pit 124. The drilling fluid transports cuttings from the wellbore 116 into the retention pit 124 and the drilling fluid's presence in the annulus aids in maintaining the integrity of the wellbore 116. Various materials can be used for drilling fluid, including oil-based fluids and water-based fluids.

Logging tools 126 can be integrated into the bottom-hole assembly 125 near the drill bit 114. As the both drill bit 114 extends into the wellbore 116 through the formations 118 and as the drill string 108 is pulled out of the wellbore 116, logging tools 126 collect measurements relating to various formation properties as well as the orientation of the tool and various other drilling conditions. The logging tool 126 can be applicable tools for collecting measurements in a drilling scenario, such as the electromagnetic imager tools described herein. Each of the logging tools 126 may include one or more tool components spaced apart from each other and communicatively coupled by one or more wires and/or other communication arrangement. The logging tools 126 may also include one or more computing devices communicatively coupled with one or more of the tool components. The one or more computing devices may be configured to control or monitor a performance of the tool, process logging data, and/or carry out one or more aspects of the methods and processes of the present disclosure.

The bottom-hole assembly 125 may also include a telemetry sub 128 to transfer measurement data to a surface receiver 132 and to receive commands from the surface. In at least some cases, the telemetry sub 128 communicates with a surface receiver 132 by wireless signal transmission. e.g, using mud pulse telemetry, EM telemetry, or acoustic telemetry. In other cases, one or more of the logging tools 126 may communicate with a surface receiver 132 by a wire, such as wired drill pipe. In some instances, the telemetry sub 128 does not communicate with the surface, but rather stores logging data for later retrieval at the surface when the logging assembly is recovered. In at least some cases, one or more of the logging tools 126 may receive electrical power from a wire that extends to the surface, including wires extending through a wired drill pipe. In other cases, power is provided from one or more batteries or via power generated downhole.

Collar 134 is a frequent component of a drill string 108 and generally resembles a very thick-walled cylindrical pipe, typically with threaded ends and a hollow core for the conveyance of drilling fluid. Multiple collars 134 can be included in the drill string 108 and are constructed and intended to be heavy to apply weight on the drill bit 114 to assist the drilling process. Because of the thickness of the collar's wall, pocket-type cutouts or other type recesses can be provided into the collar's wall without negatively impacting the integrity (strength, rigidity and the like) of the collar as a component of the drill string 108.

Figure 1B:
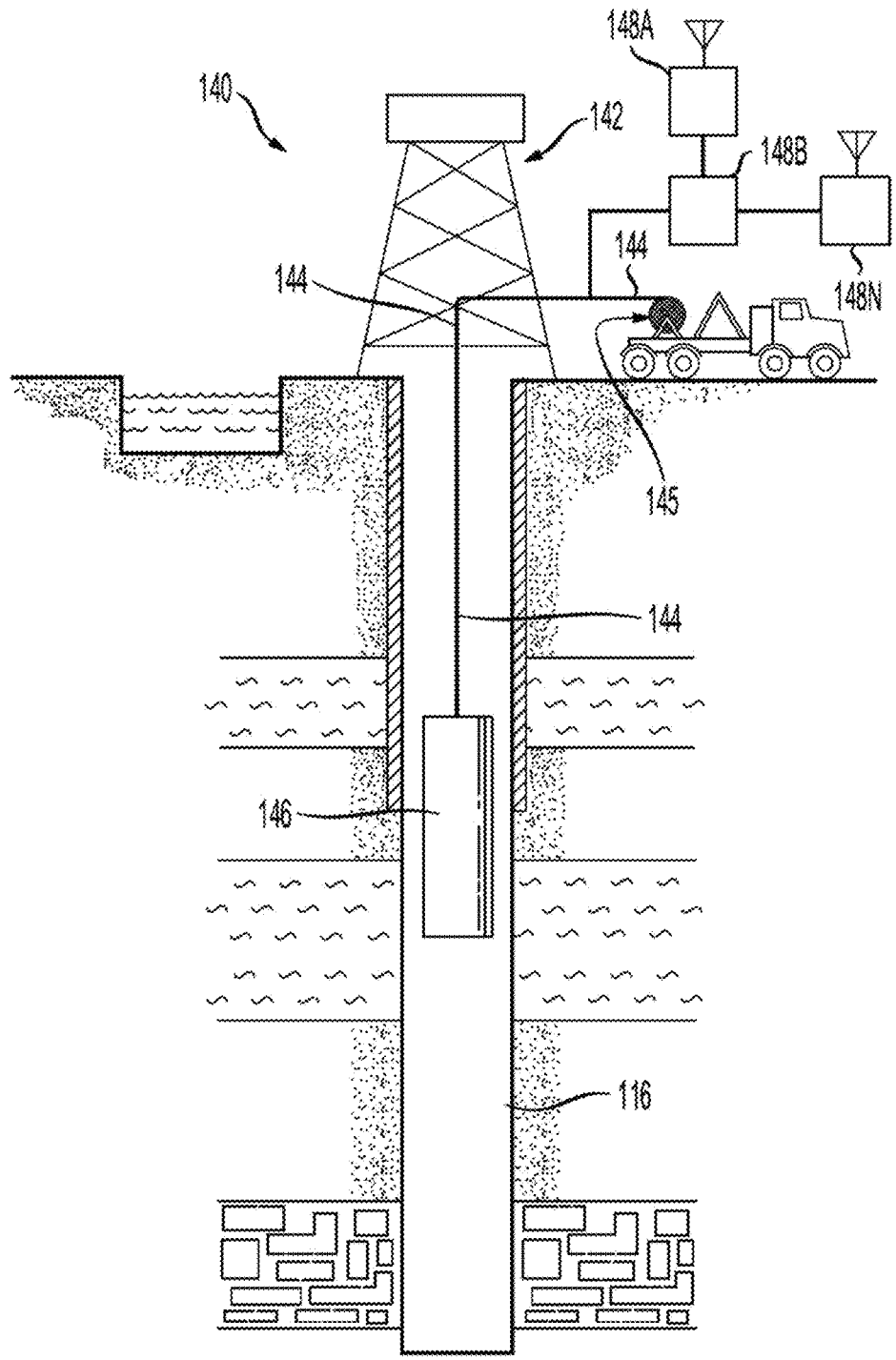
FIG. 1B is a schematic diagram of an example downhole environment having tubulars, in accordance with various aspects of the subject technology.

Referring to FIG. 1B, an example system 140 is depicted for conducting downhole measurements after at least a portion of a wellbore has been drilled and the drill string removed from the well. An electromagnetic imager tool can be operated in the example system 140 shown in FIG. 1B to log the wellbore. A downhole tool is shown having a tool body 146 in order to carry out logging and/or other operations. For example, instead of using the drill string 108 of FIG. 1A to lower the downhole tool, which can contain sensors and/or other instrumentation for detecting and logging nearby characteristics and conditions of the wellbore 116 and surrounding formations, a wireline conveyance 144 can be used. The tool body 146 can be lowered into the wellbore 116 by wireline conveyance 144. The wireline conveyance 144 can be anchored in the drill rig 142 or by a portable means such as a truck 145. The wireline conveyance 144 can include one or more wires, slicklines, cables, and/or the like, as well as tubular conveyances such as coiled tubing, joint tubing, or other tubulars. The downhole tool can include an applicable tool for collecting measurements in a drilling scenario, such as the electromagnetic imager tools described herein.

The illustrated wireline conveyance 144 provides power and support for the tool, as well as enabling communication between data processors 148A-N on the surface. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more of the processors 148A-N, which can include local and/or remote processors. The processors 148A-N can be integrated as part of an applicable computing system, such as the computing device architectures described herein. Moreover, power can be supplied via the wireline conveyance 144 to meet power requirements of the tool. For slickline or coiled tubing configurations, power can be supplied downhole with a battery or via a downhole generator.

Figure 2A:
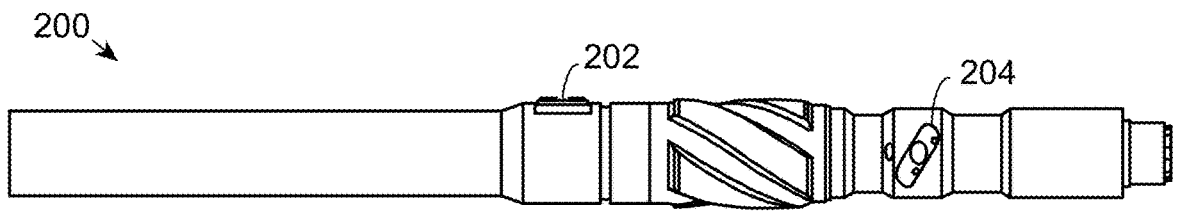
FIG. 2A illustrates a perspective view of a LWD electromagnetic imager tool.
Figure 2B:
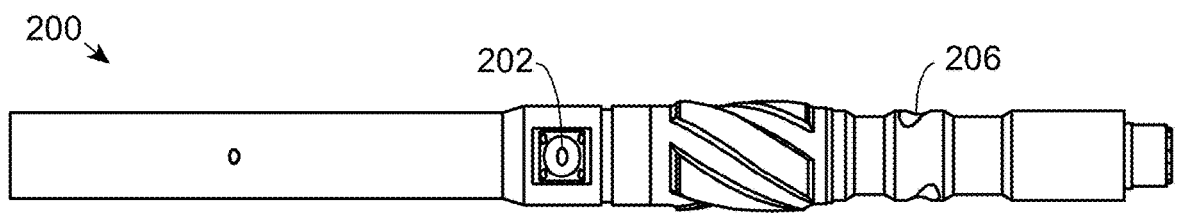
FIG. 2B illustrates another perspective view of the LWD electromagnetic imager tool.
Figure 2C:
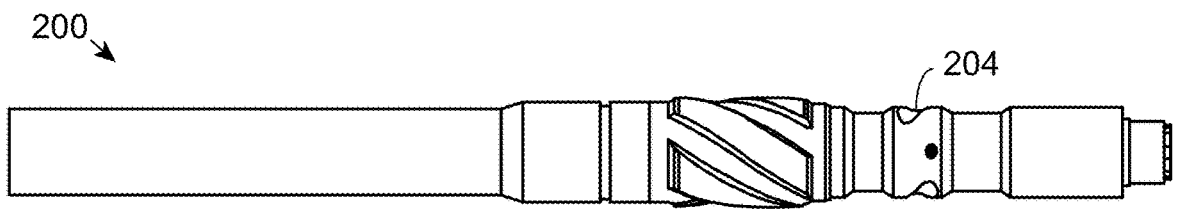
FIG. 2C illustrates yet another perspective view of the LWD electromagnetic imager tool.

FIG. 2A illustrates a perspective view of a LWD electromagnetic imager tool 200. FIG. 2B illustrates another perspective view of the LWD electromagnetic imager tool 200. FIG. 2C illustrates yet another perspective view of the LWD electromagnetic imager tool 200. The LWD electromagnetic imager tool 200/mud imager tool can be integrated as part of an applicable LWD drilling system, such as the logging tools 126 in the LWD scenario 100 shown in FIG. 1A.

The LWD electromagnetic imager tool 200 includes an electromagnetic sensor 202 disposed along a collar of the LWD electromagnetic imager tool 200. The LWD electromagnetic 200 imager tool shown in FIGS. 2A-2C also includes first and second ultrasonic transducers 204 and 206, however and in various embodiments, a LWD electromagnetic imager tool 200 does not have ultrasonic transducers disposed along the collar. Specifically, the LWD electromagnetic imager tool 200 shown in FIGS. 2A-2C is merely an example of a LWD electromagnetic imager tool 200, and in various embodiments, a LWD electromagnetic imager tool 200 can have a different design. Specifically, a water-based LWD mud imager tool may have similar designs, and can provide less design and interpretation complications than oil-based LWD mud imager tools, e.g. due to the conductive nature of water-based mud.

LWD electromagnetic mud imager tools can provide a high resolution image of a borehole, e.g. when compared to other borehole imager tools. As a result, LWD electromagnetic mud imager tools can be used to identify damaged borehole sections, provide a better knowledge on the thin beds, and also provide images that can be used to determine the dip angle of formation bed.

The sensor topology of LWD electromagnetic mud imager tools operating in a LWD environment should have minimum complexity, and more importantly, it should not rely on borehole contact. With respect to the LWD electromagnetic imager tool 200 shown in FIGS. 2A-C, the electromagnetic sensor 202 can include a single measurement (also called probe, button or current) electrode mounted on the side of the collar. The electromagnetic sensor 202 can be disposed on the collar such that it is located at a certain distance (standoff) from a borehole wall during operation of the LWD electromagnetic imager tool. Further, the electromagnetic sensor 202 can include a guard electrode that surrounds, at least a portion of the button electrode. This electrode may be excited by an alternating current, sine-wave generator, and it may be coupled to the formation through a mud, e.g. an oil-based mud. This mud is non-conductive for oil-based muds. As a result, the coupling to the formation is accomplished through displacement currents in the mud. This arrangement provides a low sensitivity to standoff changes in resultant microresistivity image.

In operation of the LWD electromagnetic imager tool 200, a measurement current enters the formation, which may have a much lower resistivity than the mud. In the formation, the current flows by conduction and penetrates the formation. The current then returns back toward the borehole where it returns to the body of the LWD electromagnetic imager tool 200 surrounding the electromagnetic sensor 202, e.g. the tool body serves as the return electrode for the LWD electromagnetic imager tool 200. The tool body can remain at ground potential because of its large surface area.

Imaging through the LWD electromagnetic imager tool 200 can be achieved by dividing gathered data/measurements into azimuthal bins as the LWD electromagnetic imager tool 200 rotates in the borehole during drilling. The LWD electromagnetic imager tool can also include an additional mud resistivity sensor, e.g. a mud cell. In imaging through the LWD electromagnetic imager tool 200, real components of the measurements made by the electromagnetic sensor 202 can be used to determine formation resistivity. Further, mud resistivity measurements made by the mud resistivity sensor can be used to improve the determined formation resistivity measurements. For the purposes of this disclosure, it is assumed that mud sensor is not available or not accurate.

The LWD electromagnetic imager tool 200 can be a multi-frequency tool. Specifically, the LWD electromagnetic imager tool 200 can operate at multiple frequencies in gathering measurements. For example, a higher frequency in the MHz range may be used to overcome the nonconductive nature of oil-based muds in generating measurements while a lower frequency in the 100 kHz range may be more sensitive to standoff and thus may be used in standoff determination. Further, gathered standoff information may be used to identify features in the formation. For example, a thin band of increased resistivity can be due to an opening in the rock. In turn, this can be reflected as a jump in apparent standoff.

Figure 3:
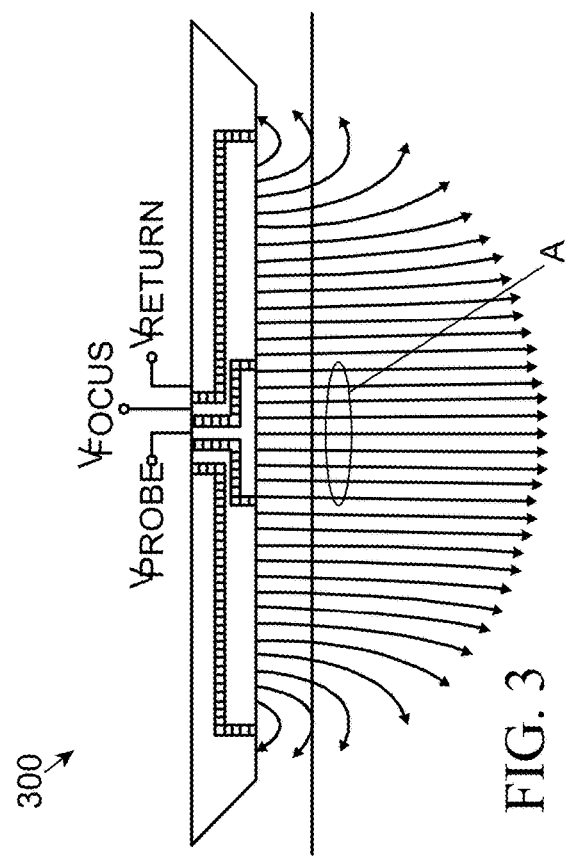
FIG. 3 shows an example current density generated by the electromagnetic sensor of the LWD electromagnetic imager tool operating to measure a formation.

FIG. 3 shows an example current density 300 generated by the electromagnetic sensor 202 of the LWD electromagnetic imager tool 200 operating to measure a formation. A power source drives a voltage between the return electrode, whose voltage with respect to the ground is represented through $V_{return}$ and the probe electrode, whose voltage with respect to a ground is represented by $V_{probe}$. Further, a circuitry is implemented to keep $V_{probe}$ equal, or roughly equal, to $V_{focus}$ for focusing of the measurement current. The current transmitted from the electromagnetic sensor is measured, for example through the use of a toroid. The ratio of the voltage difference between probe and return to the transmitted current is used to calculate a measured impedance. A basic circuit theory based model that relates the measured impedance to formation and mud parameters that is applicable to both LWD and wireline tools will be provided after a discussion on wireline electromagnetic tools.

Figure 4:
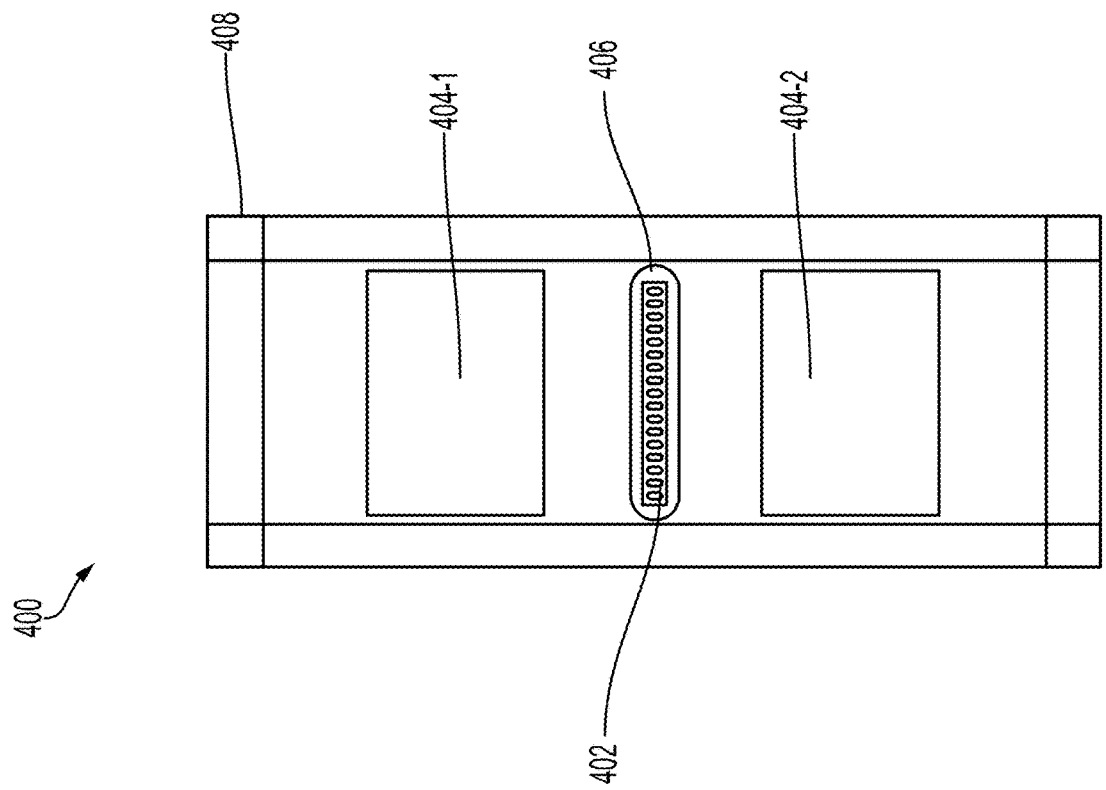
FIG. 4 illustrates a schematic diagram of an example pad of an electromagnetic imager tool, in accordance with various aspects of the subject technology.

The discussion now continues with a discussion of wireline electromagnetic imager tools. FIG. 4 illustrates a schematic diagram of an example pad 400 of a wireline electromagnetic imager tool, as described above in FIG. 1B. Specifically, the wireless electromagnetic imager tool can be integrated with the tool body 146 of the downhole tool in FIG. 1B. More specifically, the pad 400 can be disposed on an outer surface of the tool body 146 to make measurements as the downhole tool is operated within the wellbore. The electromagnetic imager tool functions to gather measurements while logging a wellbore, e.g. for purposes of imaging a formation surrounding the wellbore. Specifically, the electromagnetic imager tool can operate in a drilling mud to gather measurements for imaging the formation surrounding the wellbore. The electromagnetic imager tool can operate in an applicable type of drilling mud, such as an oil-based mud or a water-based mud, to log the wellbore. Oil-based muds have much higher resistivities than water-based muds. Therefore, the mud effect is much stronger for measurements made in oil-based muds. In operating to log the wellbore, the electromagnetic imager tool can gather applicable measurements that are capable of being measured by the electromagnetic imager tool. For example, measurements made by the electromagnetic imager tool can include apparent impedivity and impedance measurements at the electromagnetic imager tool, complex impedance measurements at the electromagnetic imager tool, voltage measurements at the electromagnetic imager tool, current measurements at the electromagnetic imager tool, phase measurements at the electromagnetic imager tool, and absolute values of impedance measurements at the electromagnetic imager tool.

The measurements gathered by the electromagnetic imager tool can be used to identify values of mud and formation parameters associated with the electromagnetic imager tool, e.g. parameters inside of and outside of the wellbore. Mud and formation parameters include applicable parameters that can be identified from measurements taken by the electromagnetic imager tool for purposes of imaging, e.g. through the wellbore. For example, mud and formation parameters can include mud permittivity, mud resistivity, standoff, formation permittivity of a formation of the wellbore, and formation resistivity of the formation of the wellbore. The values of the mud and formation parameters can be identified using the techniques described herein on a per-button basis for wireline imagers. For example, formation resistivity, formation permittivity, mud resistivity, mud permittivity and standoff values can be identified for each button included as part of a button array 402 of a pad 400. For LWD imagers, measurements are generally obtained using a single button electrode. In that case, azimuthal coverage is obtained by dividing the measurements into azimuthal bins as the tool rotates. Thus, these azimuthal bins in an LWD tool serves the same purpose with the measurements made by multiple button electrodes spaced circumferentially around the tool in a wireline tool. Although the origin of the measurements are different in LWD and wireline tools, the processing methods described herein equally applies to both type of tools.

In operating the wireline electromagnetic imager tool to gather measurements for imaging, a voltage difference can be applied across the button array 402 and first and second return electrodes 404-1 and 404-2 (return electrodes 404) of the pad 400. This voltage difference can generate currents that pass from the button array 402 into the mud and a surrounding formation. The pad 400 also includes a guard electrode 406 around the button array 402. The same potential that is applied to the button array 402 can be applied to the guard electrode 406 to focus all or a substantial portion of the current emitted into the mud and the surrounding formation. Specifically, the current can be emitted substantially radially into the surrounding formation by applying the same potential on the guard electrode 406 and the button array 402. An applicable electrical and/or thermal insulating material, such as a ceramic, can fill the remaining portions of the pad 400. For example, a ceramic material can be disposed between the return electrodes 404 and the guard electrode 406. The pad 400 is covered, at least in part, with a housing 408. The housing 408, and accordingly the pad 400 through the housing 408, can be connected through a securing mechanism to a mandrel. The securing mechanism can be a movable mechanism that moves the housing 408 and the contained pad 400 to substantially maintain contact with the formation. For example, the securing mechanism can include an arm that opens and/or swivels to move the housing 408 and the contained pad 400. By moving the housing 408 and the contained pad to maintain a good contact with the formation, the mud effect can be minimized for wireline imager tools.

Turning back to a discussion of the mud effect and its impact on electromagnetic imager tools, the mud effect, as described previously, refers to the contribution of the mud to the measured impedance. Further and as discussed previously, this effect is particularly severe if a formation exhibits low resistivity and the distance between the button electrode's outer surface and the borehole wall, e.g. the formation, is high. In those instances, measured impedance may have very low sensitivity to the formation features. Maintaining good contact between the pad 400 and the formation can help wireline imager tools to ensure that the electromagnetic imager tool actually measures the formation and not just the mud when the formation has low resistivity. Since mud effect is a function of standoff, the term standoff effect may be used interchangeably with mud effect in what follows. As will be discussed in greater detail later, the mud effect can be minimized or removed using an applicable technique, such as the techniques described herein. Further, the mud effect can be minimized or removed based on a mud angle determined using an applicable technique, such as the techniques described herein.

Figure 5:
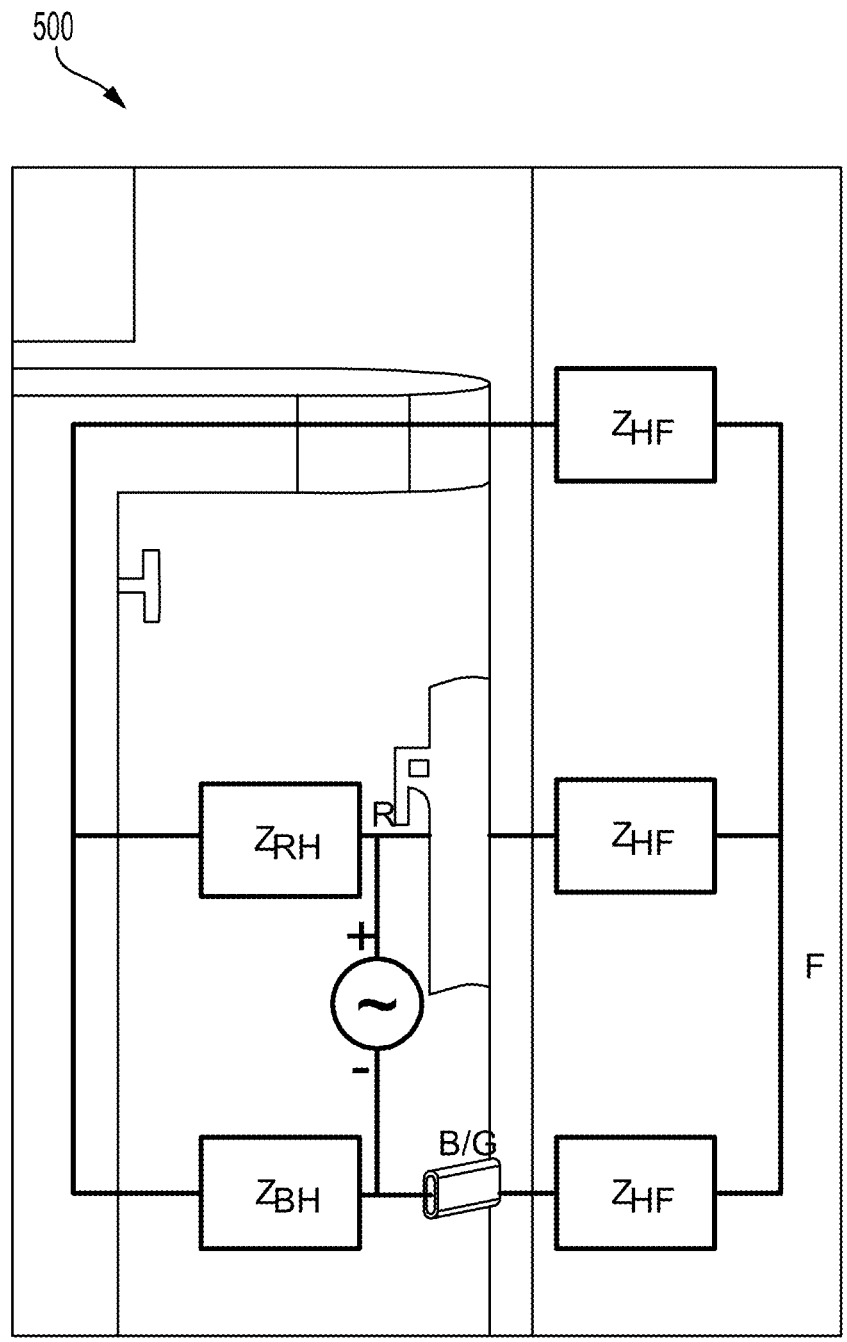
FIG. 5 illustrates a circuit model of the example pad illustrated in FIG. 4, in accordance with various aspects of the subject technology.

FIG. 5 illustrates a circuit model of the example pad 400 illustrated in FIG. 4. Although the exact design of the tool is different for LWD tools, as described with respect to FIGS. 2A-3, the equations derived for the circuit model shown in FIG. 5 are applicable for LWD tools. In the model, H denotes the housing (including the mandrel), F denotes the formation, either B or G denotes the button and guard assembly, and R denotes the return signal from the formation and/or the mud. While most of the transmitted current can be returned to the return electrodes, some portions of the transmitted current can return through the housing and/or the mandrel. An impedance value for each button can be calculated by measuring the voltage between the buttons and the return electrodes and dividing the measured voltage by the current transmitted through each button of the button array. Specifically, this technique is represented in Equation 1 shown below. In Equation 1, Z is the button impedance of one of the buttons in the button array, $V_{BR}$ is the button to return voltage, and $I_B$ is the button current. With respect to the LWD tools described in FIGS. 2A-C and FIG. 3, $V_{BR}$ can be replaced with the probe to return voltage, and $I_B$ can be replaced with the current of the probe.

$$Z = \frac{V_{BR}}{I_B} \qquad \text{Equation 1}$$

A calculated button impedance, e.g. calculated by Equation 1, can be equal to the impedances of the button and guard assembly and the formation $Z_{BF}$ and the impedances of the return and the formation $Z_{RF}$, as shown in the circuit model in FIG. 5. While $Z_{BF}$ and $Z_{RF}$ are denoted with respect to the formation F, $Z_{BF}$ and $Z_{RF}$ can have contributions from both the mud and the formation. Thus, $Z_{BF}$ can equivalently be represented by Equation 2 shown below.

$$Z \approx Z_{BF} = Z_{mud} Z_F \qquad \text{Equation 2}$$

Accordingly, a measured button impedance, as shown in Equation 2, can have contributions from both the mud and the formation. If the imaginary parts of $Z_F$ and $Z_{mud}$ are mainly capacitive, and assuming this capacitance is in parallel with the resistive portion, $Z_{BF}$ can also be written as shown in Equation 3 below.

$$Z_{BF} = \frac{1}{\left(\frac{1}{R_M} + j\omega C_M\right)} + \frac{1}{\left(\frac{1}{R_F} + j\omega C_F\right)} \qquad \text{Equation 3}$$

In Equation 3, R and C denote the resistance and capacitance and w is the angular frequency (e.g. $\omega=2\pi f$ where f is the frequency in Hz). In Equation 3, subscript M denotes the mud while F denotes the formation. Both the mud resistance and mud capacitance can increase with standoff and decrease with the effective areas of the buttons.

Equation 3 can provide just a basic approximation to the impedance measured by the electromagnetic imager tool. However, Equation 3 can be useful in illustrating the effects of mud and formation parameters on the measured impedance. Specifically, from Equation 3, it can be deduced that high frequencies are needed to reduce the mud contribution to the measured impedance.

Figure 6:
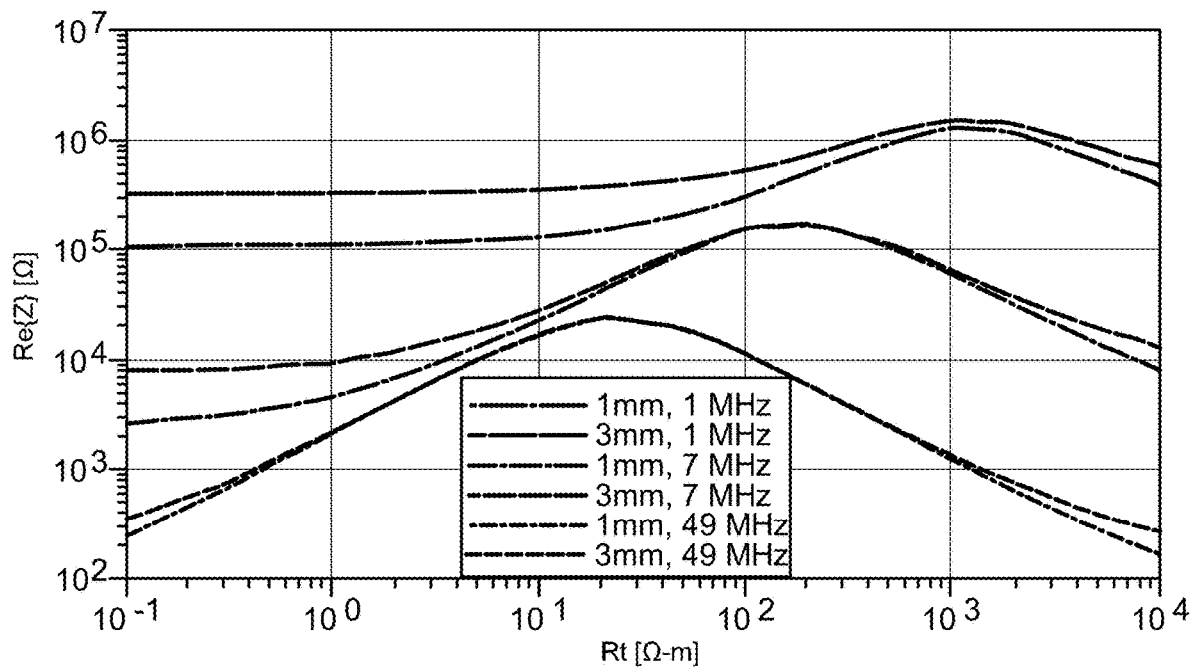
FIG. 6 is a plot of impedances measured by the electromagnetic imager tool versus formation resistivity $R_t$, in accordance with various aspects of the subject technology.

FIG. 6 is a plot of real parts of the impedances measured by the electromagnetic imager tool versus formation resistivity $R_r$. In the plot shown in FIG. 6, it is assumed that formation permittivity ($\varepsilon_F$) is 15, mud permittivity ($\varepsilon_M$) is 6, and mud resistivity ($\rho_M$) is 8000 Ω-m. Results for three different frequencies (1 MHz, 7 MHz and 49 MHz) at two different standoffs (1 mm and 3 mm) are shown. Standoff, as used herein, is the distance of the button electrode's outer surface from the borehole wall. It can be seen from FIG. 6 that there is a separation between different standoffs at lower formation resistivities. This effect can be more pronounced if the frequency is lower. At higher formation resistivities, the dielectric effect in the formation becomes more important and causes a roll-off in measured impedance.

With respect to the mud effect, it can be desirable to operate in a linear region of the curves shown in FIG. 6. Specifically, operating in a linear region can lead to a more accurate correspondence between the real parts of impedance and the true formation resistivity. Further, the mud effect at low formation resistivities can cause an ambiguity in the interpretation of impedance, e.g. through impedance images.

Figure 7:
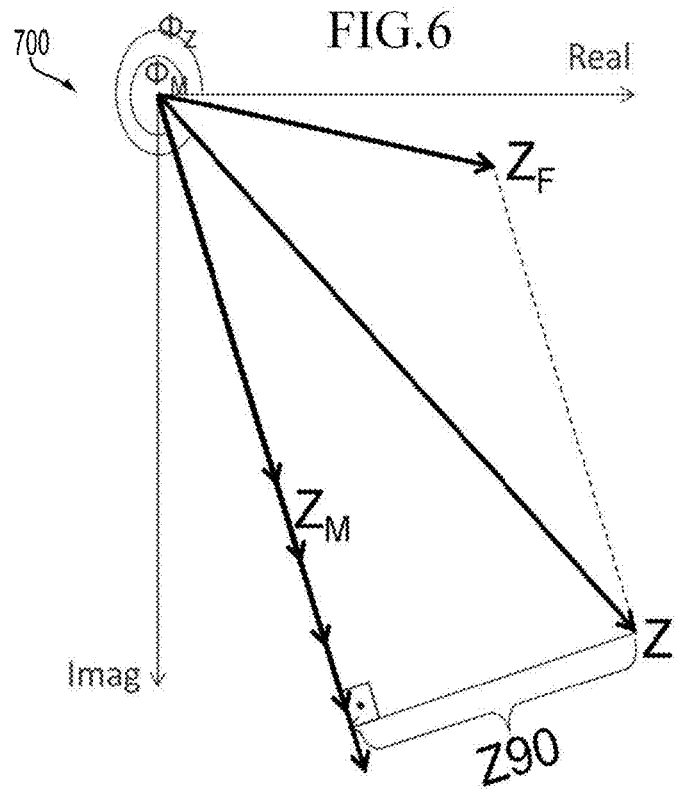
FIG. 7 is a plot of impedances in the complex plane and corresponding Z90 processing of the impedances, in accordance with various aspects of the subject technology.

The description now turns to a discussion of the Z90 processing technique for reducing the mud effect. FIG. 7 is a plot 700 of impedances in the complex plane and corresponding Z90 processing of the impedances. While the Z90 processing technique is discussed throughout this paper, the techniques for identifying mud angle described herein, can be implemented in an applicable processing technique that utilizes a mud angle associated with the electromagnetic imager tool.

Z90 processing is applied to reduce the mud effect and make the response of the mud imager tool, e.g. the impedance response, more linear. In the plot 700 shown in FIG. 7, measured impedance Z, mud impedance $Z_M$, and formation impedance $Z_F$ are shown as vectors in the complex plane. Although the approximate direction of the mud impedance vector $Z_M$ can be known, the strength of the vector depends on a number of factors including standoff. However, an orthogonal projection of Z on $Z_M$ can be calculated accurately by measuring the phase angle of the measured impedance, $\phi_Z$, and the phase angle of the mud impedance, $\phi_M$, also referred to as the mud angle. This is applicable to Z90 processing because Z90 processing functions by removing the orthogonal projection of the measured impedance Z on the mud impedance vector $Z_m$ from the measured impedance Z. In turn, this can reduce or remove the mud effect. The resultant impedance created through Z90 processing, Z90, can be represented as shown below in Equation 4.

$$Z90 = |Z|\sin(\varphi_Z - \varphi_M) \qquad \text{Equation 4}$$

Figure 8:
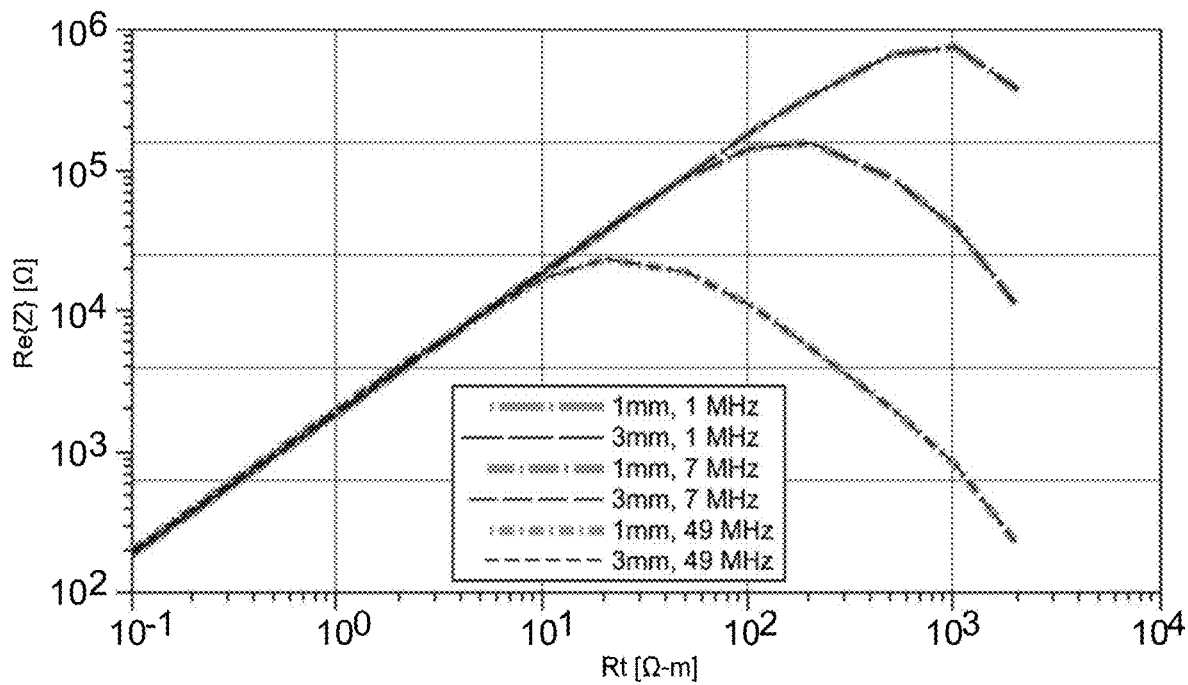
FIG. 8 is a plot of real parts of simulated impedances measured by the electromagnetic imager tool versus simulated formation resistivities $R_t$ after Z90 processing is applied, in accordance with various aspects of the subject technology.

FIG. 8 is a plot of real parts of simulated impedances measured by the electromagnetic imager tool versus simulated formation resistivities $R_t$ after Z90 processing is applied. Specifically, FIG. 8 is a plot of the impedances shown in FIG. 6 after Z90 processing is performed. As shown in the plot in FIG. 8, the impedance response is more linear across a wider range of formation resistivities after Z90 processing, corresponding to removal of the mud effect from the impedance measurements.

As shown in Equation 4, Z90 processing is dependent on the mud angle, $\phi_M$, associated with the electromagnetic imager tool. In an ideal scenario, the mud angle is assumed to be known, e.g. mud cell measurements or measurements in a cased section of a wellbore. If the mud angle is perfectly known, then Z90 will not have any mud contribution and thus, will be equal to a weighted sum of the real part of formation impedance and the imaginary part of the formation impedance. This is indicated in Equation 5 shown below.

$$Z90 \approx w_1 \, \text{Re}\{Z_F\} + w_2 \text{Im}\{Z_F\} \qquad \text{Equation 5}$$

If it is further assumed that the imaginary part of the formation impedance can be neglected, then Z90 will indeed be a very good approximation to the real formation impedance, as shown in Equation 5.

The plot shown in FIG. 8 was made by applying the Z90 processing technique with correct mud angles identified through simulation. Specifically, the mud angles were identified for a circuit representation of an applicable wireline or LWD electromagnetic imager tool, such as the circuit model for the pad 400 shown in FIG. 4. The correct mud angles identified for the different frequencies are shown in Table 1 below.

TABLE 1

| 1 MHz | 7 MHz | 49 MHz |
|---|---|---|
| −69.47° | −86.9377° | 89.5621° |

Although the term "mud angle" is used in its singular form throughout this discussion, this is done for simplicity and it is appreciated that mud angle actually varies with frequency.

While the plot shown in FIG. 8 was made using accurate mud angles, as discussed previously, the correct mud angle is not actually known in most scenarios and an inaccurate candidate of the mud angle is often used. This can ultimately impact processes, e.g. the Z90 technique, that utilize the mud angle associated with the electromagnetic imager tools.

As discussed previously, one solution to using incorrect mud angle candidates is to directly measure the mud through the electromagnetic imager tool. This measurement can be made by closing the arms of a wireline tool such that contributions from formation resistivity in the tool response are minimized. However and as discussed previously, this is an inefficient usage of the electromagnetic imager tool. Furthermore, this technique is not applicable to LWD tools. Even for wireline tools, the direct measurements made by the tool will still include some formation contributions as well as measurement noise which can negatively impact Z90 processing results. Furthermore, tool calibration may not have been optimized for a case where the pad is close to the tool body causing further inaccuracies. Alternatively, a dedicated mud cell may be included in the tool but this brings forth additional design complexities in addition to the costs associated with incorporating this extra part to the tool. To illustrate the formation contribution and measured noise, the identified mud angle values are shifted 0.5° from their exact values, as shown in Table 2 below.

TABLE 2

| 1 MHz | 7 MHz | 49 MHz |
|---|---|---|
| −68.97° | −86.4377° | 89.0621° |

Figure 9:
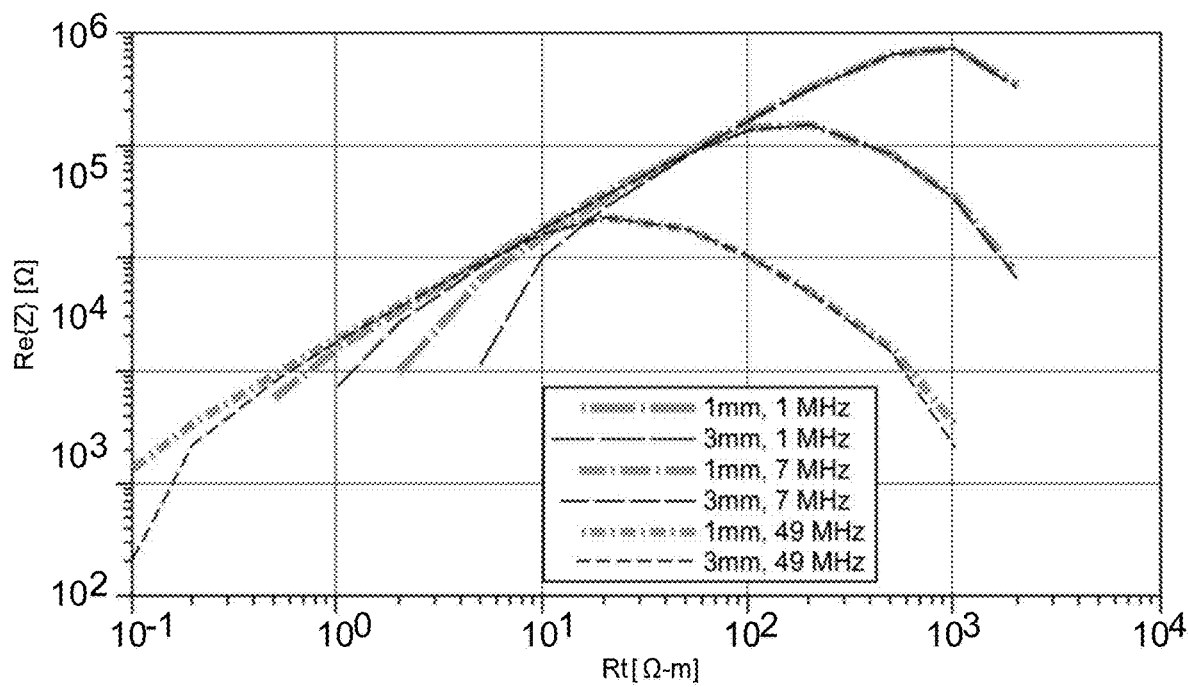
FIG. 9 is a plot of real parts of simulated impedances measured by the electromagnetic imager tool versus simulated formation resistivities $R_t$ after Z90 processing is performed on the shifted mud angles, in accordance with various aspects of the subject technology.

FIG. 9, is a plot of real parts of simulated impedances measured by the electromagnetic imager tool versus simulated formation resistivities $R_t$ after Z90 processing is performed on the shifted mud angles. Specifically, the plot shown in FIG. 9 is meant to illustrate the effects of direct mud measurements and associated noise on Z90 processing. As shown in FIG. 9, even a deviation as small as 0.5° from the correct value of the mud angle can cause large errors in the processed results. Specifically, this plot shows that an incorrect mud angle, be it as a result of direct mud measurements, noise, and or an incorrect assumption of the mud angle, leads to large errors in the processed results.

Figure 10:
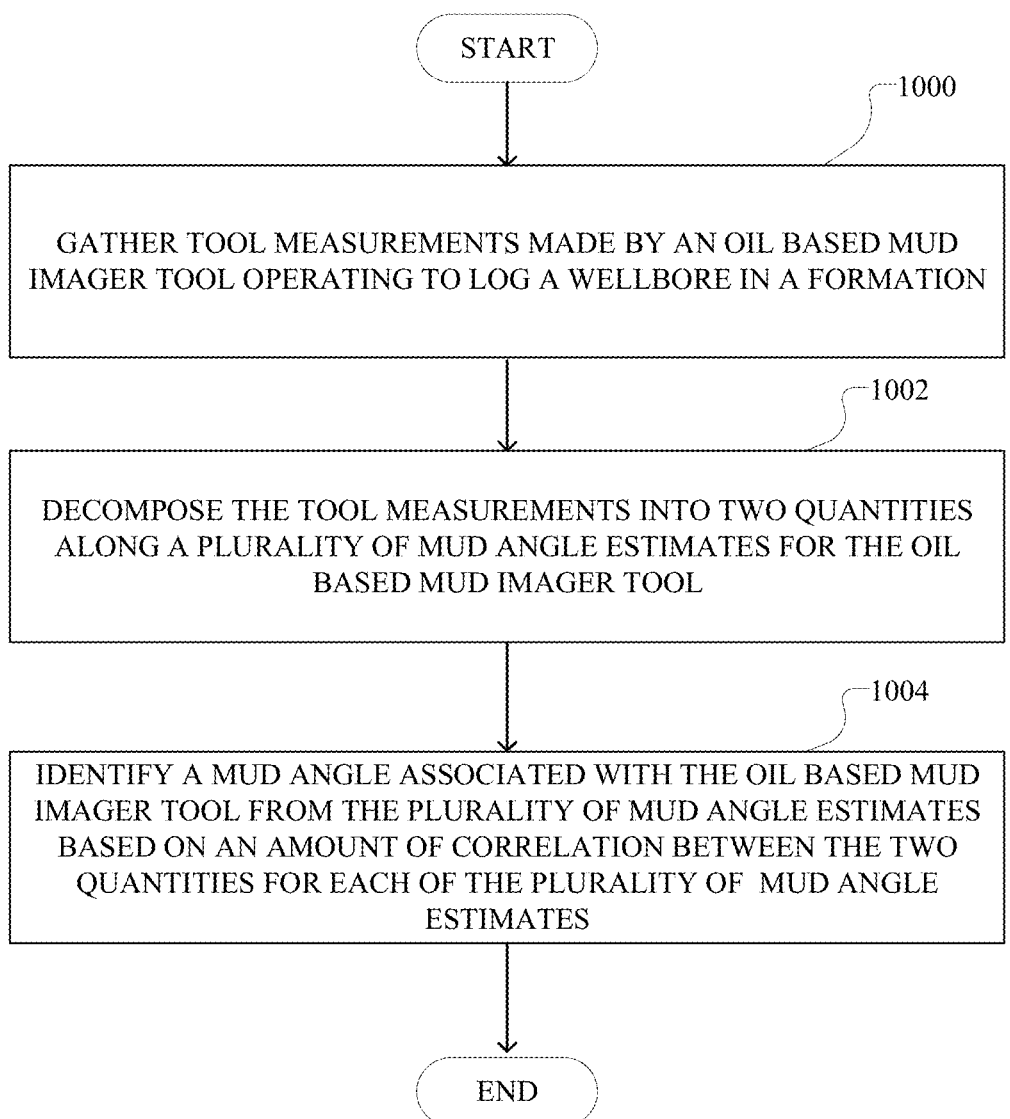
FIG. 10 illustrates a flowchart for an example method of identifying a mud angle for an electromagnetic imager tool based measurements made by the electromagnetic imager tool, in accordance with various aspects of the subject technology.

FIG. 10 illustrates a flowchart for an example method of identifying a mud angle for an electromagnetic imager tool based measurements made by the electromagnetic imager tool. The method shown in FIG. 10 is provided by way of example, as there are a variety of ways to carry out the method. Additionally, while the example method is illustrated with a particular order of steps, those of ordinary skill in the art will appreciate that FIG. 10 and the modules shown therein can be executed in any order and can include fewer or more modules than illustrated. Each module shown in FIG. 10 represents one or more steps, processes, methods or routines in the method.

The example method shown in the flowchart of FIG. 10 can be used to overcome the previously described deficiencies in identifying mud angle for processing technique, e.g. the Z90 processing technique. Specifically and as will be discussed in greater detail later, an accurate estimation of mud angle associated with the electromagnetic imager tool can be identified from measurements made by the mud imager tool operating to log a wellbore, e.g. as part of imaging a formation. This is in contrast to current techniques that inaccurately identify mud angle of the electromagnetic imager tool. Further, the example method shown in FIG. 10 can be implemented without directly measuring the mud and instead can rely on measurements made in actually imaging the formation to identify the mud angle. This can solve for the previously described inaccuracies in mud angle estimation through direct mud measurements and corresponding noise.

At step 1000, tool measurements made by the electromagnetic imager tool operating to log a wellbore are gathered. Specifically, the tool measurements gathered at step 1000 can be made as the electromagnetic imager tool operates to image a surrounding formation of the wellbore. Tool measurements made by the electromagnetic imager tool can include applicable measurements made by the electromagnetic imager tool operating to log the wellbore.

The tool measurements made by the electromagnetic imager tool can be gathered from one or more images of the formation that are created based on measurements gathered by the electromagnetic imager tool. Specifically, the tool measurements can be gathered from one or more images of the formation that are generated by an electromagnetic imaging system associated with the electromagnetic imager tool. For example, impedance measurements made by the electromagnetic imager tool can be gathered from one or more images of the formation generated based on the impedance measurements.

At step 1002, the tool measurements are decomposed into two quantities along a plurality of mud angle candidates for the electromagnetic imager tool. Decomposition, as used herein, can include applying an applicable technique to change the measurements made by the electromagnetic imager tool into quantities in a measurable space. Specifically, decomposition can include projecting the measurements or components derived from the measurements, transforming the measurements or the components derived from the measurements, or applying one or more functions to the measurements or the components derived from the measurements to create two quantities in a measurable space. Quantities, as used herein, can include applicable quantities that are capable of being decomposed from the measurements into a measurable space. For example and as will be discussed in greater detail later, decomposing the measurements into two quantities can include generating magnitudes of two orthogonal components of measured impedance at the electromagnetic imager tool. Further in the example, one of the quantities can be in a direction normal to a mud angle candidate of a plurality of mud angle candidates for the electromagnetic imager tool. Additionally, another of the quantities can be in a direction parallel to a mud angle candidate of a plurality of mud angle candidates for the electromagnetic imager tool.

In decomposing the tool measurements into two quantities along a plurality of mud angle candidates for the electromagnetic imager tool, the tool measurements can be decomposed into the two quantities for each of the mud angle candidates. Specifically, the tool measurements can be decomposed into the same two quantities for each of the mud angle candidates. For example, magnitudes of two orthogonal components of measured impedance can be identified for each mud angle candidate for the electromagnetic imager tool. Values of the two quantities can vary between the different mud angle candidates. For example, a magnitude of an orthogonal component of measured impedance for a first mud angle candidate can be greater than a magnitude of the orthogonal component of the measured impedance for a second mud angle candidate. In another example, a projection of a measurement in a direction of a first mud angle candidate can differ from a projection of the measurement in a direction of a second mud angle candidate.

At step 1004, a mud angle associated with the electromagnetic imager tool is identified from the plurality of mud angle candidates based on an amount of correlation between the two quantities for the plurality of mud angle candidates. Specifically, a mud angle associated with the electromagnetic imager tool can be identified from the plurality of mud angle candidates based on an amount of correlation between the two quantities for each of the plurality of mud angle candidates. Correlation, as used herein, can be defined according to one or more applicable characteristics of the quantities that relate or otherwise associate the quantities with each other. For example, correlation can include comparing defined characteristics of projected impedance vectors that relate the projected impedance vectors in the complex space. An applicable technique for correlating quantities in a measurable space can be applied to measure an amount of correlation between the two quantities for the mud angle candidates. For example, the Pearson product-moment correlation coefficient can be used to measure an amount of correlation between the two quantities for each of the mud angle candidates. In another example, Spearman's rank correlation coefficient and distance correlation can be used to measure an amount of correlation between the two quantities for each of the mud angle candidates.

The amount of correlation between the two quantities along the plurality of mud angle candidates can be identified along a specific depth interval of the gathered tool measurements. For example, the amount of correlation between impedance vectors decomposed from gathered impedance measurements can be identified for the mud angle candidates along a specific depth interval of the corresponding impedance measurements. The depth interval used in determining correlation between the two quantities can have a length suitable to account for variations in either or both a resistivity profile of the formation and rugosity in one or more walls of the wellbore. For example, impedance measurements gathered over varying resistivity levels of the formation can be decomposed into the two quantities along the mud angle candidates. In turn, the amount of correlation between the two quantities along the mud angle candidates can be determined to ultimately identify one or more mud angles associated with the electromagnetic imager tool.

The mud angle can be identified from the plurality of mud angle candidates based on the mud angle having the smallest amount of correlation between the two quantities amongst each of the plurality of mud angle candidates. In a simplified example, a first mud angle candidate can have less correlation between impedance projections than a second mud angle candidate. In turn, the first mud angle candidate can be selected for the electromagnetic imager tool based on the amount of correlation between the two quantities.

In various embodiments, a plurality of mud angles can be identified from the plurality of mud angle candidates based on an amount of correlation between the two quantities for each of the plurality of mud angle candidates. In turn, the mud angle amongst the identified plurality of mud angles that that minimizes the correlation between the two quantities can ultimately be selected. In various embodiments, multiple candidate mud angles can minimize the correlation between the two quantities, e.g. depending on the mud angle candidates and/or the correlated quantities. In turn, multiple mud angles from the candidate mud angles can be identified and one or more of the identified mud angles can be chosen based on a rule. For example, a mud angle that is closest to −90° can be selected from a plurality of candidate mud angles that minimize the correlation between the two quantities. The plurality of mud angles identified from the plurality of mud angle candidates based on an amount of correlation between the two quantities can form a range of mud angles. Further the plurality of mud angles can include a subset of mud angle candidates that are physically reasonable, e.g. actually capable of being achieved in the mud. For example, the plurality of mud angles can be located in the fourth quadrant of the complex plane, e.g. −90° to 0°.

One or more mud angles identified from the plurality of mud angle candidates based on an amount of correlation between the two quantities can be processed using an applicable technique that utilizes mud angles associated with the electromagnetic imager tool. For example, a mud effect removal process, e.g. Z90 processing, can be applied to one or more images based on the identified mud angle to remove the mud effect from the one or more images. This can improve both quality and contrast in the images, particularly in areas of the image affected by the mud effect. Additionally, the one or more mud angles identified from the plurality of mud angle candidates can be returned to a user, e.g. along with one or more processed images. The user can use the returned mud angle(s) in applying further processing, such as application of an advanced inversion for other mud and formation parameters/properties. In turn, this can reduce amounts of time and computational resources used in applying the advanced inversion.

The description now turns to a discussion of the different quantities that can be decomposed from the tool measurements to identify the mud angle. For example, the tool measurements can be decomposed into magnitudes of two orthogonal components of measured impedance at the electromagnetic imager tool. As measurements gathered by the electromagnetic imager tool are gathered over a large amount of measurement points, e.g. in both the azimuthal direction and the depth direction, the measurements can be flattened into vectors as part of decomposing the tool measurements into the two quantities.

In various embodiments, the tool measurements can be decomposed into two quantities including magnitudes of the orthogonal components of measured impedance at the electromagnetic imager tool. In particular, one or more angles that minimize the correlation of the Z90 measurement with the projection of the measured impedance along a candidate mud angle direction, $Z\|$, can be identified. $Z\|$ is shown in Equation 6 below.

$$Z_\| = |Z|\cos\varphi_Z-\varphi_M \quad \text{Equation 6}$$

Figure 11:
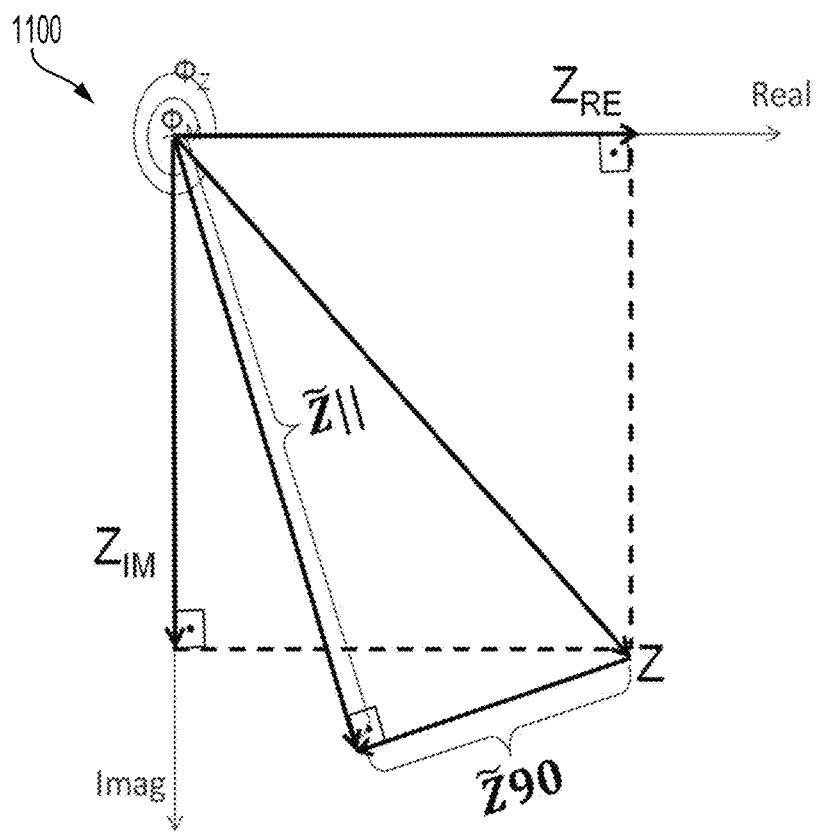
FIG. 11 is a plot of Z90 and Z∥ vectors in the complex plane for identifying the mud angle based on correlation of Z90 and Z∥ quantities, in accordance with various aspects of the subject technology.

FIG. 11 is a plot 1100 of Z90 and $Z\|$ vectors in the complex plane for identifying the mud angle based on correlation of Z90 and $Z\|$ quantities. Projections of the measured impedance on the real and imaginary axes, where $Z_{RE}$ denotes the real part of the measured impedance and $Z_{IM}$ denotes the imaginary part of the measured impedance, are also shown in the plot 1100. If the candidate mud angle is denoted as $\tilde{\varphi}_M$, where the tilde denotes that the value is an estimate, then $\tilde{Z}90$ and $\tilde{Z}\|$ denote the projections corresponding to this candidate mud angle. As follows the mud angle can be selected according to Equation 7 shown below.

$$\arg_{\tilde{\varphi}_M} \lfloor |\mathrm{corr}(\tilde{Z}90,\tilde{Z}\|)| \rfloor \quad \text{Equation 7}$$

In Equation 7, con( ) denotes the correlation of quantities Z90 and $Z\|$. The quantities can be correlated through an applicable correlation technique, such as using the Pearson product-moment correlation coefficient, as shown in Equation 8 below.

$$\mathrm{corr}(\tilde{Z}90,\tilde{Z}\|) = \frac{\mathrm{Cov}(\tilde{Z}90,\tilde{Z}\|)}{\sigma_{\tilde{Z}90}\sigma_{\tilde{Z}\|}} \quad \text{Equation 8}$$

In Equation 8, Cov ( ) denotes the covariance of the two vectors while a denotes the standard deviation of $\tilde{Z}90$ and $\tilde{Z}\|$. Through application of the Pearson product-moment correlation coefficient, correlation can become negative. This can indicate a dependence of two vectors that behave in opposite ways, e.g. one decreases while the other increases. Since the techniques describe herein can use a minimized correlation dependence, an absolute value sign was included in Equation 7 to account for negative correlation.

In various embodiments, the tool measurements can be decomposed into a first quantity including a magnitude of a component of measured impedance at the electromagnetic imager tool normal to a candidate mud angle of the plurality of candidate mud angles. Further, the tool measurements can be decomposed into a second quantity including an imaginary component of the measured impedance. In turn, the magnitude of the component of the measured impedance normal to the candidate mud angles can be correlated with the imaginary component of the measured impedance to ultimately identify the mud angle for the electromagnetic imager tool. Specifically, correlation of the Z90 with $Z_{IM}$ can be used instead of $Z\|$ to identify the mud angle. Since Z90 is a measure of the formation resistivity, Equation 9 can be used to obtain the mud angle that minimizes Z90 and $Z_{IM}$ among a range of possible candidate mud angles.

$$\arg_{\tilde{\varphi}_M} \min \lfloor |\mathrm{corr}(\tilde{Z}90,Z_{IM})| \rfloor \quad \text{Equation 9}$$

In various embodiments, the tool measurements can be decomposed into a first quantity including a magnitude of a $Z\alpha$ projection of measured impedance at the electromagnetic imager tool generated based on candidate mud angles. The $Z\alpha$ projection of measured impedance can be a vector projection of $Z\alpha$ processing in a complex plane. Specifically, the $Z\alpha$ projection can be the projection of the vector starting from a measured impedance and ending on a vector parallel to a mud impedance. Further, the tool measurements can be decomposed into a second quantity including an imaginary component of the measured impedance. In turn, the magnitude of the $Z\alpha$ projection for the candidate mud angles can be correlated with the imaginary component of the measured impedance to ultimately identify the mud angle for the electromagnetic imager tool. The mud angle candidate can be identified based on Equation 10. In Equation 10, the tilde over $Z\alpha$ represents that the $Z\alpha$ is calculated using the corresponding mud angle estimate $\tilde{\varphi}_M$.

$$\arg_{\tilde{\varphi}_M} \min \lfloor |\mathrm{corr}(\tilde{Z}\alpha,Z_{IM})| \rfloor \quad \text{Equation 10}$$

In various embodiments, the tool can be decomposed into a first quantity including a magnitude of a component of measured impedance at the electromagnetic imager tool normal to a candidate mud angle\ of the plurality of candidate mud angles. Further, the tool measurements can be decomposed into a second quantity including the component of the measured impedance normal to the candidate mud angle removed from a real component of the measured impedance. In turn, the magnitude of the component of the measured impedance at the electromagnetic imager tool normal to the candidate mud angles can be correlated with the component of the measured impedance normal to the candidate mud angle removed from the real component of the measured impedance to ultimately identify the mud angle for the electromagnetic imager tool. The candidate mud angle can be identified based on Equation 11.

$$\arg_{\tilde{\varphi}_M} \min \lfloor |\mathrm{corr}(\tilde{Z}90,(Z_{RE}-\tilde{Z}90))| \rfloor \quad \text{Equation 11}$$

In various embodiments, the tool can be decomposed into a first quantity including a magnitude of a $Z\alpha$ projection of measured impedance at the electromagnetic imager tool generated based on a candidate mud angle of the plurality of candidate mud angles. Further, the tool measurements can be decomposed into a second quantity including the $Z\alpha$ projection of the measured impedance generated based on the candidate mud angle removed from a real component of the measured impedance. In turn, the magnitude of the $Z\alpha$ projection of the measured impedance at the electromagnetic imager tool generated based on the candidate mud angle can be correlated with the $Z\alpha$ projection of the measured impedance generated based on the candidate mud angle removed from the real component of the measured impedance to ultimately identify the mud angle for the electromagnetic imager tool. The candidate mud angle can be made based on Equation 12.

$$\arg_{\widetilde{\varphi_M}} \min \lfloor |\mathrm{corr}(\tilde{Z}\alpha,(Z_{RE}-\tilde{Z}\alpha)|)| \rfloor \qquad \text{Equation 12}$$

Tool measurements that are decomposed and used to identify the one or more mud angles can be a subset of the total number of tool measurements made by the electromagnetic imager tool. In particular, specific tool measurements or groups of tool measurements can be selected from the total number of tool measurements made by the electromagnetic imager tool, e.g. in generating one or more images. In turn, the identified tool measurements can be used in identifying the mud angle of the electromagnetic imager tool.

Tool measurements can be selected from a plurality of tool measurements based on absolute values of the tool measurements. Further, the tool measurements can be selected from the plurality of tool measurements using a histogram. Specifically, the tool measurements can be selected based on a histogram of absolute values of the tool measurements. In turn, the measurements selected based on the histogram of absolute values can further be filtered to select measurements with relatively lower absolute impedance values. If exact cutoffs are irrelevant, e.g. where calibration is believed to be inadequate, a percentage based threshold may be applied rather than a predefined threshold for measurement selection. For example, the impedance measurements in the lowest 25% of impedances can be filtered out from the measurements selected using the histogram of absolute values. In order to further simplify calculations, these filtered measurements can be reduced even more by randomly/pseudo-randomly selecting measurements from these filtered measurements. In various embodiments, lowest impedances can be undesirable due to noise or other applicable effects, such as the tool body effect. Accordingly, the measurements can have very low sensitivities to the formation. As a result, a lower threshold of absolute impedances can be applied, e.g. a threshold between 5% and 25% may be used.

Further, tool measurements can be selected from a plurality of tool measurements based on either or both real values and imaginary values of the tool measurements. Real parts of the measurements can be scaled by a tool constant to give apparent resistivity values. However, using absolute value to select the tool measurements can be more beneficial than using the real part of the tool measurements since real part of the measurements does not monotonically increase with formation resistivity. Absolute value measurements may also be preferable to imaginary value measurements since they are more sensitive to formation resistivity if the formation resistivity is low.

Tool measurements can also be selected from a plurality of tool measurements manually by an operator. Specifically, an operator can manually select the tool measurements from the plurality of tool measurements by visually inspecting the plurality of tool measurements and/or one or more images generated from the plurality of tool measurements. For example, an operator can select regions in an image log that have low resistivities and show the mud effect. An operator can also use data from other applicable tools to select the tool measurements from the plurality of tool measurements. In particular, an operator can use data from other tools that logged the formation to select the tool measurements from the plurality of tool measurements. For example, an operator can use formation resistivity results created through a multi-component induction tool or an array laterolog tool to select the tool measurements from the plurality of tool measurements. Alternatively, an operator does not actually select the tool measurements using other tools, but instead the process of selecting the tool measurements based on measurements made by other tools is automated. For example, tool measurements can automatically be selected for formation regions that have low resistivities, as measured by other tools.

Thresholds for selecting tool measurements from a plurality of tool measurements, e.g. the previously described impedance thresholds, can change based on operating frequency of the electromagnetic imager tool. In turn, the tool measurements can be selected based on an operating frequency of the electromagnetic imager tool in making the tool measurements. Further, thresholds can be specific to different formation types. In turn, the thresholds can be selected and applied based on the type of formation that is imaged. Thresholds for selecting tool measurements can be determined and modified by an operator. Specifically, an operator can set thresholds based on a visualization of data. For example, a plot of the real parts of data against the absolute values of the data can be used by an operator to identify thresholds.

Additionally, tool measurements can be selected based on assigned quality indicators to the tool measurements or regions including the tool measurements. For example, a formation region can have high expected resistivities, e.g. as identified by other tools. As a result, the region can be assigned a low quality indicator and tool measurements in these regions can be excluded from the selected tool measurements, e.g. based on the low quality indicator. Further, tool measurements can be selected based on noise levels in the tool measurements. Specifically, the tool measurements can be assigned a quality indicator based on the noise levels in the tool measurements. Subsequently, the tool measurements can be selected if the noise levels are low in the measurements, e.g. as indicated by the quality indicator assigned to the measurements. Noise levels in the measurements can be determined using an applicable technique. For example, changes in a signal for measurements in proximity to each other can be used to determine noise levels in the measurements.

Additionally, tool measurements can be selected from a plurality of tool measurements made by the electromagnetic imager tool based on resistivity measurements made by a different tool from the electromagnetic imager tool, e.g. another tool configured to image a formation. For example, tool measurements can be selected from a plurality of tool measurements made by the electromagnetic imager tool based on resistivity measurements made by an induction type logging tool separate from the electromagnetic imager tool. In another example, tool measurements can be selected from a plurality of tool measurements made by the electromagnetic imager tool based on resistivity measurements made by a laterolog type logging tool separate from the electromagnetic imager tool.

The description now turns to a discussion of an example simulation of identifying mud angles of the electromagnetic imager tool according to the techniques described herein.

In Table 3 shows mud angle values generated using the techniques described herein.

TABLE 3

| 1 MHz | 7 MHz | 49 MHz |
|---|---|---|
| −69.46° | −86.93° | −89.55° |

The mud angle values shown in Table 3 were generated used the same mud properties and formation permittivity used to generate the plots shown in FIGS. 8 and 9. To obtain a realistic simulation, a Monte Carlo type simulation was performed where the standoff and formation resistivities were chosen as random/pseudo-random variables with a uniform distribution. Standoff was varied between 1 mm and 5 mm, and formation resistivity was changed between 0.1 Ω-m and 20 Ω-m for 1 MHz, 0.1 Ω-m and 6 Ω-m for 7 MHz, and 0.1 Ω-m and 1 Ω-m for 49 Mhz. These resistivity value ranges for different frequencies is in line with the aforementioned variation of thresholds in selecting resistivity ranges for different frequencies.

Then, using the impedances obtained from the Monte Carlo simulation and Equations 7 and 8, the mud angle that minimizes the correlation among the mud angle values in the fourth quadrant of the complex plane, e.g. between −90° and 0°, was found. A brute force search with a spacing of 0.01° was used in this calculation. Therefore, the results shown in Table 3 can be varied to an accuracy of 0.005°. More complicated techniques can be employed to calculate the mud angle that minimizes Equation 7, such as interpolating the results, fine tuning the results around the final result, or performing an inversion. The computed mud angles shown in Table 3 are very close to true values. The simulation was based on the approximate circuit model of the tool, as shown in FIG. 5, which does not contain noise. However, standoff and formation resistivity were varied.

Figure 12:
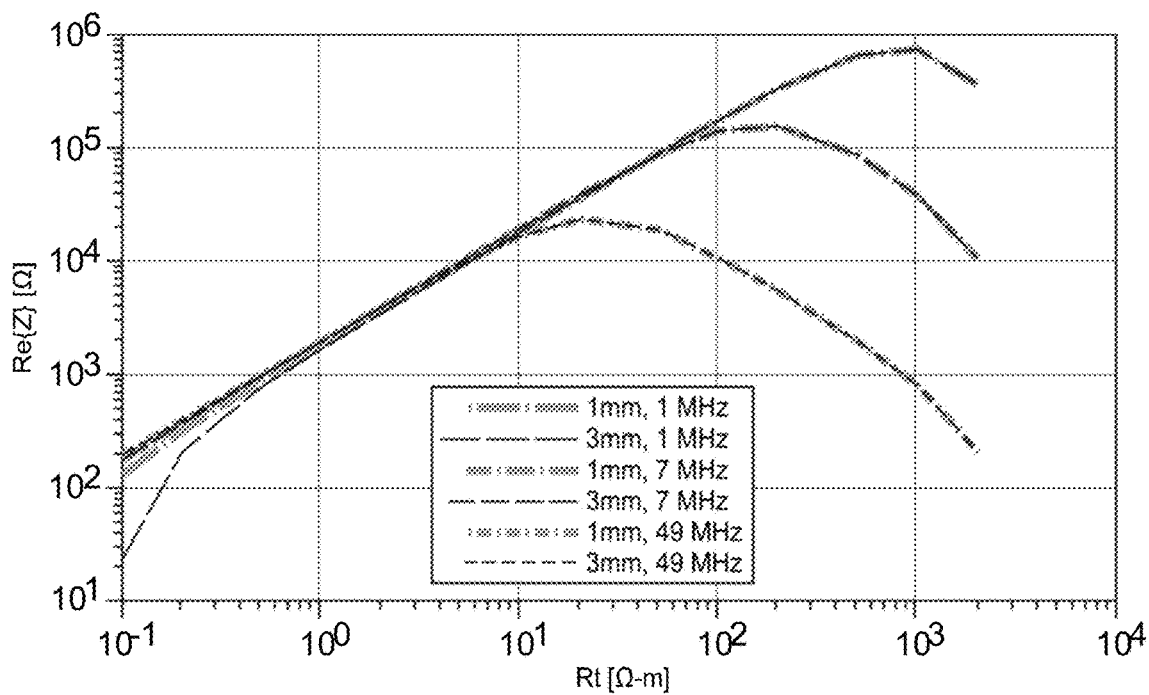
FIG. 12 is a plot of real parts of impedances versus simulated formation resistivities $R_t$ after Z90 processing is applied based on mud angles identified using the techniques described herein, in accordance with various aspects of the subject technology.

FIG. 12 is a plot of real parts of impedances versus simulated formation resistivities $R_t$ after Z90 processing is applied based on mud angles identified using the techniques described herein. These results are very close to the case shown in the plot in FIG. 8. The largest discrepancies between the two plots occur for the lowest frequency and at very low resistivities. However, the error in mud angle is just 0.01° for this frequency. In practice, most electromagnetic imager tools employ multiple frequencies so for low resistivity range a higher frequency can be used to image.

Figure 13A:
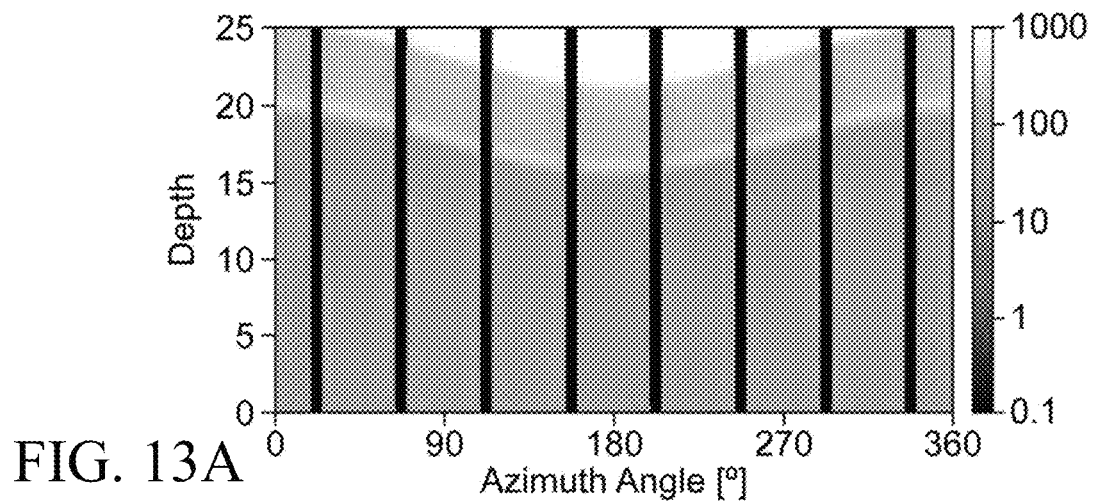
FIGS. 13A-C are resistivity images, in the logarithmic scale, of another simulation, in accordance with various aspects of the subject technology.
Figure 13B:
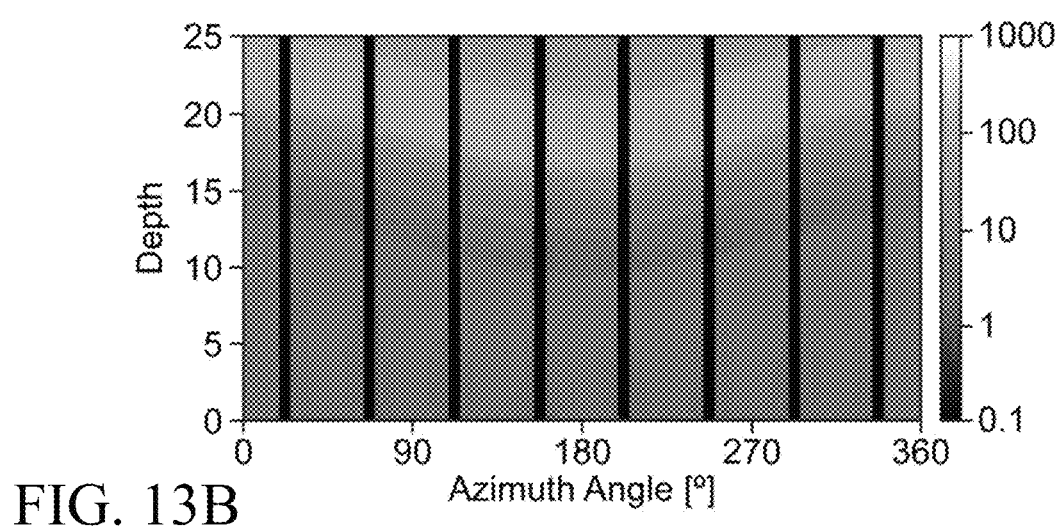
Figure 13C:
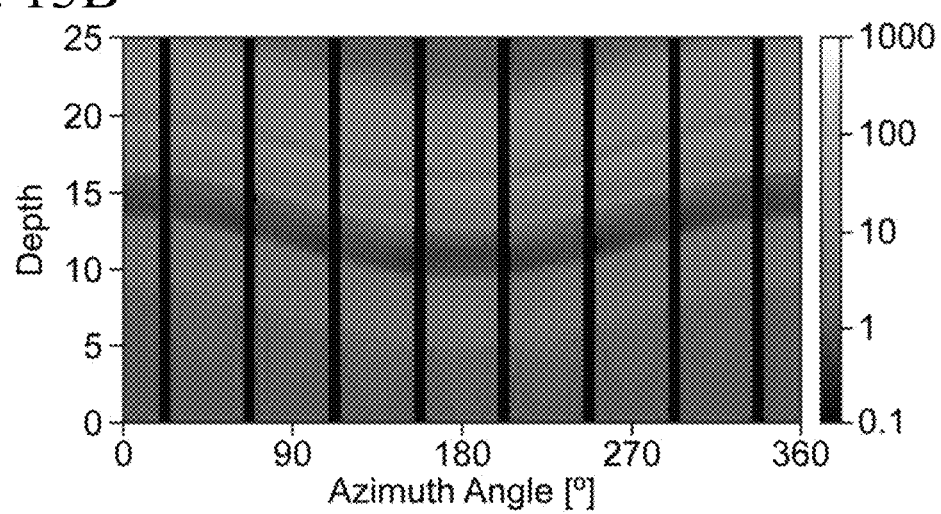

FIGS. 13A-C are resistivity images, in the logarithmic scale, of another simulation. The resistivity images shown in FIGS. 13A-C are obtained synthetically, e.g. without any processing using a mud angle identified by the techniques described herein. True resistivity values in this scenario correspond to layers with 30° dip and low resistivities up to a depth of 15.3 inches and then higher resistivity layers above 15.3 inches, e.g. for the button with an azimuth angle of 180° as a reference. It is assumed that formation permittivity ($\varepsilon_F$) is 15, mud permittivity ($\varepsilon_M$) is 6, and mud resistivity ($\rho_M$) is 8000 Ω-m, which is the same as described previously with respect to the plot shown in FIG. 6. However, simulated frequencies in this case are 1, 10 and 50 MHz. Theoretical mud angles obtained for these frequencies using the circuit model are listed in Table 4.

TABLE 4

Resistivities of layers in the formation are listed in Table 5.

| 1 MHz | 10 MHz | 50 MHz |
|---|---|---|
| −69.47° | −87.855° | −89.571° |

TABLE 5

| Resistivity (Ohmm) | Upper Bound (Inch) |
|---|---|
| 1000 | ~∞ |
| 100 | 21.1 |
| 10000 | 16.5 |

TABLE 5-continued

| Resistivity (Ohmm) | Upper Bound (Inch) |
|---|---|
| 6 | 15.3 |
| 3 | 14.2 |
| 10 | 13.0 |
| 0.6 | 12.4 |
| 0.1 | 11.3 |
| 0.3 | 10.1 |
| 2 | 9.5 |
| 1 | 4.9 |

Image gray scale is based on the apparent resistivity obtained by dividing the impedances measured at the buttons by an appropriate tool constant. Pixels where there is no data is shown as solid vertical lines in these images.

Figure 14:
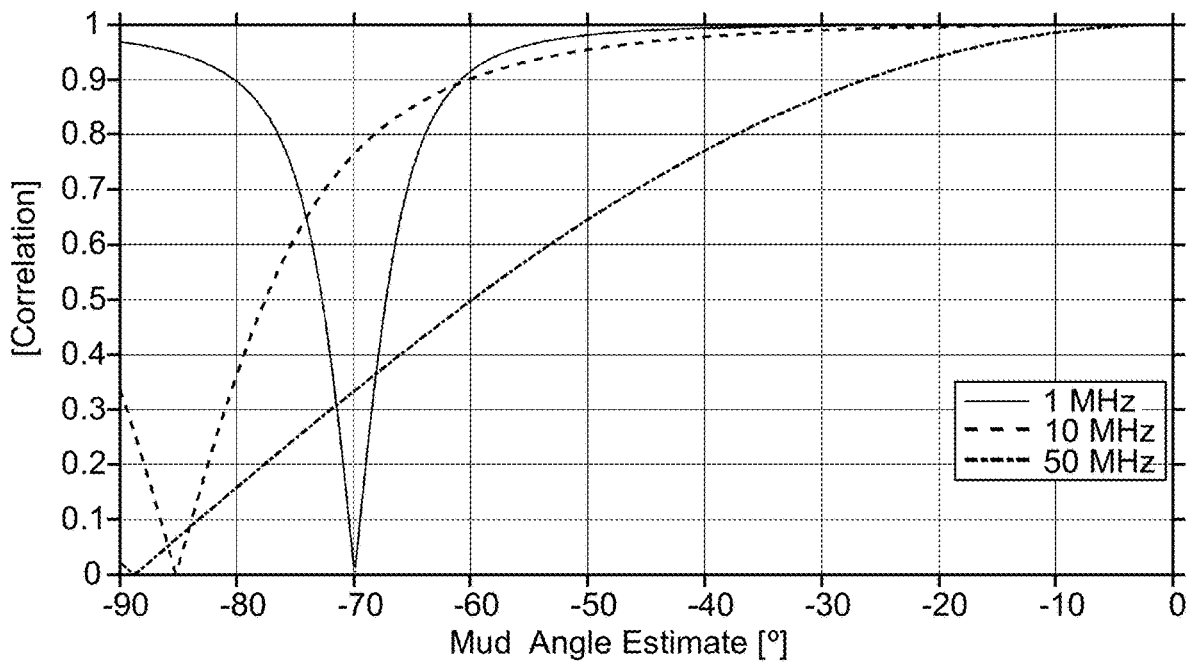
FIG. 14 is a plot of the variation of the absolute value of correlation as a function of candidate mud angles, identified using the techniques described herein, for the corresponding three different frequencies of the simulations represented in FIGS. 13A-C, in accordance with various aspects of the subject technology.

As shown in FIGS. 13A-C, the low frequency case is especially insensitive to the low resistivity layers due to the mud effect. This is problematic and is correctable by processing corresponding measurements using a mud angle identified through the techniques described herein. Specifically, FIG. 14 is a plot of the variation of the absolute value of correlation as a function of candidate mud angles, identified using the techniques described herein, for the corresponding three different frequencies of the simulations represented in FIGS. 13A-C. A range of candidate mud angles between −90° and 0° was selected. Correlation shows a single minimum in the chosen range. Mud angles corresponding to this minimum decreases, e.g. gets closer to −90°, as the frequency increases. Table 6 lists the candidate mud angles that minimized the correlation curves shown in FIG. 14. It can be seen that the results, although imperfect for this multilayer case, e.g. due to shoulder bed and other higher order effects, are very close to the true values, e.g. the greatest error is less than 3° for 10 MHz.

TABLE 6

| 1 MHz | 7 MHz | 49 MHz |
|---|---|---|
| −69.926° | −85.168° | −88.765° |

Figure 15:
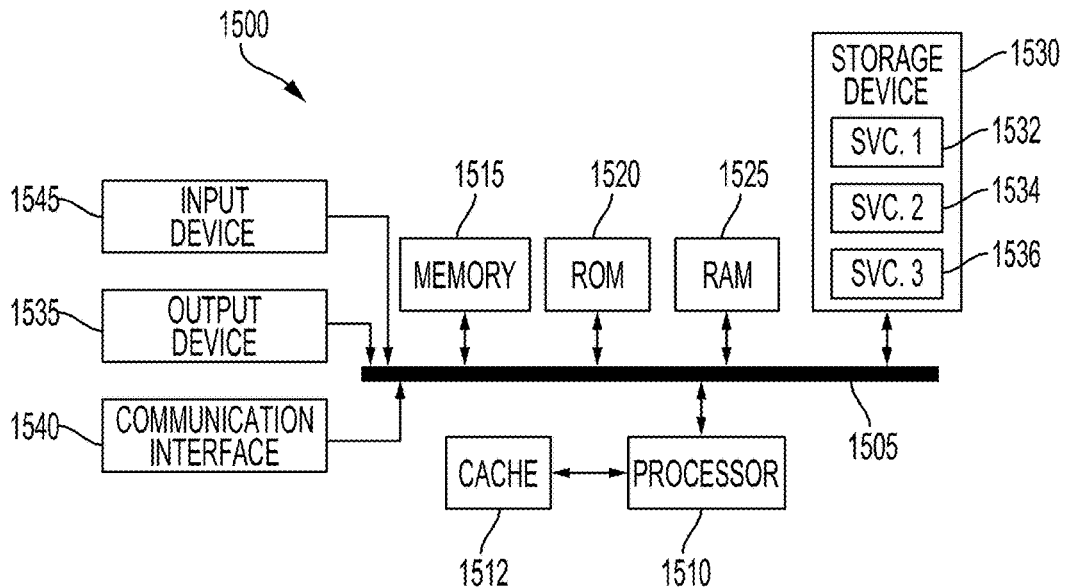
FIG. 15 illustrates an example computing device architecture which can be employed to perform various steps, methods, and techniques disclosed herein.

FIG. 15 illustrates an example computing device architecture 1500 which can be employed to perform various steps, methods, and techniques disclosed herein. Specifically, the computing device architecture can be integrated with the electromagnetic imager tools described herein. Further, the computing device can be configured to implement the techniques of controlling borehole image blending through machine learning described herein.

As noted above, FIG. 15 illustrates an example computing device architecture 1500 of a computing device which can implement the various technologies and techniques described herein. The components of the computing device architecture 1500 are shown in electrical communication with each other using a connection 1505, such as a bus. The example computing device architecture 1500 includes a processing unit (CPU or processor) 1510 and a computing device connection 1505 that couples various computing device components including the computing device memory 1515, such as read only memory (ROM) 1520 and random access memory (RAM) 1525, to the processor 1510.

The computing device architecture 1500 can include a cache of high-speed memory connected directly with, in close proximity to, or integrated as part of the processor 1510. The computing device architecture 1500 can copy data from the memory 1515 and/or the storage device 1530 to the cache 1512 for quick access by the processor 1510. In this way, the cache can provide a performance boost that avoids processor 1510 delays while waiting for data. These and other modules can control or be configured to control the processor 1510 to perform various actions. Other computing device memory 1515 may be available for use as well. The memory 1515 can include multiple different types of memory with different performance characteristics. The processor 1510 can include any general purpose processor and a hardware or software service, such as service 11532, service 21534, and service 31536 stored in storage device 1530, configured to control the processor 1510 as well as a special-purpose processor where software instructions are incorporated into the processor design. The processor 1510 may be a self-contained system, containing multiple cores or processors, a bus, memory controller, cache, etc. A multi-core processor may be symmetric or asymmetric.

To enable user interaction with the computing device architecture 1500, an input device 1545 can represent any number of input mechanisms, such as a microphone for speech, a touch-sensitive screen for gesture or graphical input, keyboard, mouse, motion input, speech and so forth. An output device 1535 can also be one or more of a number of output mechanisms known to those of skill in the art, such as a display, projector, television, speaker device, etc. In some instances, multimodal computing devices can enable a user to provide multiple types of input to communicate with the computing device architecture 1500. The communications interface 1540 can generally govern and manage the user input and computing device output. There is no restriction on operating on any particular hardware arrangement and therefore the basic features here may easily be substituted for improved hardware or firmware arrangements as they are developed.

Storage device 1530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1525, read only memory (ROM) 1520, and hybrids thereof. The storage device 1530 can include services 1532, 1534, 1536 for controlling the processor 1510. Other hardware or software modules are contemplated. The storage device 1530 can be connected to the computing device connection 1505. In one aspect, a hardware module that performs a particular function can include the software component stored in a computer-readable medium in connection with the necessary hardware components, such as the processor 1510, connection 1505, output device 1535, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

A method comprising gathering tool measurements made by an electromagnetic imager tool operating to log a wellbore in a formation. The method can also include decomposing the tool measurements into two quantities along a plurality of candidate mud angles for the electromagnetic imager tool. Further, the method can include identifying a mud angle associated with the electromagnetic imager tool from the plurality of candidate mud angles based on an amount of correlation between the two quantities for each of the plurality of candidate mud angles.

A system comprising one or more processors and at least one computer-readable storage medium having stored therein instructions. The instructions which, when executed by the one or more processors, cause the one or more processors to perform operations comprising gathering tool measurements made by an electromagnetic imager tool operating to log a wellbore in a formation. Further, the instructions can cause the one or more processors to decompose the tool measurements into two quantities along a plurality of candidate mud angles for the electromagnetic imager tool. Additionally, the instructions can cause the one or more processors to identify a mud angle associated with the electromagnetic imager tool from the plurality of candidate mud angles based on an amount of correlation between the two quantities for each of the plurality of candidate mud angles.

A non-transitory computer-readable storage medium having stored therein instructions which, when executed by a processor, cause the processor to perform operations comprising gathering tool measurements made by an electromagnetic imager tool operating to log a wellbore in a formation. The instructions can cause the processor to decompose the tool measurements into two quantities along a plurality of candidate mud angles for the electromagnetic imager tool. Further, the instructions can cause the processor to identify a mud angle associated with the electromagnetic imager tool from the plurality of candidate mud angles based on an amount of correlation between the two quantities for each of the plurality of candidate mud angles.

The one or more images generated from the tool measurements can be processed by applying a mud effect removal process to the tool measurements based on the identified mud angle. The identified mud angle can have a smallest amount of correlation between the two quantities across the plurality of candidate mud angles. Further, values of the two quantities vary along the plurality of candidate mud angles. The two quantities can include magnitudes of two orthogonal components of measured impedance at the electromagnetic imager tool where one quantity of the two quantities is in a direction normal to a candidate mud angle of the plurality of candidate mud angles and a second quantity of the two quantities is in the direction parallel to a candidate mud angle of the plurality of candidate mud angles. Further, a first quantity of the two quantities can include a magnitude of a component of measured impedance at the electromagnetic imager tool normal to a candidate mud angle of the plurality of candidate mud angles and a second quantity of the two quantities can include an imaginary component of the measured impedance. Additionally, a first quantity of the two quantities can include a magnitude of a $Z\alpha$ projection of measured impedance at the electromagnetic imager tool generated based on a candidate mud angle of the plurality of candidate mud angles and a second quantity of the two quantities can include an imaginary component of the measured impedance. A first quantity of the two quantities can include a magnitude of a component of measured impedance at the electromagnetic imager tool normal to a candidate mud angle of the plurality of candidate mud angles and a second quantity of the two quantities can include the component of the measured impedance normal to the candidate mud angle removed from a real component of the measured impedance. Also, a first quantity of the two quantities can include a magnitude of a $Z\alpha$ projection of measured impedance at the electromagnetic imager tool generated based on a candidate mud angle of the plurality of candidate mud angles and a second quantity of the two quantities can include the $Z\alpha$ projection of the measured impedance generated based on the candidate mud angle removed from a real component of the measured impedance.

The amount of correlation between the two quantities along the plurality of candidate mud angles can be identified along a depth interval of the tool measurements made by the electromagnetic imager tool. A length of the depth interval of the tool measurements can account for variations in either or both a resistivity profile of the formation and rugosity in one or more walls of the wellbore. The tool measurements decomposed into the two quantities can be a subset of a total number of tool measurements made by the electromagnetic imager tool operating to log the wellbore. The tool measurements can be selected from the total number of tool measurements made by the electromagnetic imager tool based on one or a combination of real values, imaginary values, and absolute values of the tool measurements. Further, the tool measurements can be selected from the total number of tool measurements made by the electromagnetic imager tool based on one or more operating frequencies of the electromagnetic imager tool in making the tool measurements. Additionally, the tool measurements can be selected from the total number of tool measurements made by the electromagnetic imager tool based on a histogram of absolute values of at least a portion of the total number of tool measurements. The tool measurements can also be selected from the total number of tool measurements made by the electromagnetic imager tool based on noise levels in the tool measurements.

The tool measurements can be selected from the total number of tool measurements made by the electromagnetic imager tool based on one or a combination of visual inspection of at least a portion of the total number of tool measurements, visual inspection of one or more images of the formation generated from the at least a portion of the total number of tool measurements, and the resistivity measurements made by a different tool from the electromagnetic imager tool.

The electromagnetic imager tool can be disposed in the wellbore. In turn, the electromagnetic imager tool can be operated in the wellbore to gather the tool measurements by logging the wellbore.

What is claimed is:

1. A method comprising:
   gathering tool measurements made by an electromagnetic imager tool operating to log a wellbore in a formation;
   decomposing the tool measurements into two quantities along a plurality of candidate mud angles for the electromagnetic imager tool, wherein values of the two quantities vary along the plurality of candidate mud angles;
   identifying a mud angle associated with the electromagnetic imager tool from the plurality of candidate mud angles, wherein the identified mud angle is the candidate mud angle having a smallest amount of correlation between the two quantities decomposed from the tool measurements for each of the plurality of candidate mud angles; and
   processing one or more images generated from the tool measurements by applying a mud effect removal process to the tool measurements using the identified mud angle.

2. The method of claim 1, wherein the two quantities include magnitudes of two orthogonal components of measured impedance at the electromagnetic imager tool where one quantity of the two quantities is in a direction normal to a candidate mud angle of the plurality of candidate mud angles and a second quantity of the two quantities is in the direction parallel to a candidate mud angle of the plurality of candidate mud angles.

3. The method of claim 1, wherein a first quantity of the two quantities includes a magnitude of a component of measured impedance at the electromagnetic imager tool normal to a candidate mud angle of the plurality of candidate mud angles and a second quantity of the two quantities includes an imaginary component of the measured impedance.

4. The method of claim 1, wherein a first quantity of the two quantities includes a magnitude of a $Z\alpha$ projection of measured impedance at the electromagnetic imager tool generated based on a candidate mud angle of the plurality of candidate mud angles and a second quantity of the two quantities includes an imaginary component of the measured impedance.

5. The method of claim 1, wherein a first quantity of the two quantities includes a magnitude of a component of measured impedance at the electromagnetic imager tool normal to a candidate mud angle of the plurality of candidate mud angles and a second quantity of the two quantities includes the component of the measured impedance normal to the candidate mud angle removed from a real component of the measured impedance.

6. The method of claim 1, wherein a first quantity of the two quantities includes a magnitude of a $Z\alpha$ projection of measured impedance at the electromagnetic imager tool generated based on a candidate mud angle of the plurality of candidate mud angles and a second quantity of the two quantities includes the $Z\alpha$ projection of the measured impedance generated based on the candidate mud angle removed from a real component of the measured impedance.

7. The method of claim 1, wherein the amount of correlation between the two quantities along the plurality of candidate mud angles is identified along a depth interval of the tool measurements made by the electromagnetic imager tool.

8. The method of claim 7, wherein a length of the depth interval of the tool measurements accounts for variations in either or both a resistivity profile of the formation and rugosity in one or more walls of the wellbore.

9. The method of claim 1, wherein the tool measurements decomposed into the two quantities are a subset of a total number of tool measurements made by the electromagnetic imager tool operating to log the wellbore.

10. The method of claim 9, wherein the tool measurements are selected from the total number of tool measurements made by the electromagnetic imager tool based on one or a combination of real values, imaginary values, and absolute values of the tool measurements.

11. The method of claim 9, wherein the tool measurements are selected from the total number of tool measurements made by the electromagnetic imager tool based on one or more operating frequencies of the electromagnetic imager tool in making the tool measurements.

12. The method of claim 9, wherein the tool measurements are selected from the total number of tool measurements made by the electromagnetic imager tool based on a histogram of absolute values of at least a portion of the total number of tool measurements.

13. The method of claim 9, wherein the tool measurements are selected from the total number of tool measurements made by the electromagnetic imager tool based on noise levels in the tool measurements.

14. The method of claim 9, wherein the tool measurements are selected from the total number of tool measurements made by the electromagnetic imager tool based on one or a combination of visual inspection of at least a portion of the total number of tool measurements, visual inspection of one or more images of the formation generated from the at least a portion of the total number of tool measurements, and resistivity measurements made by a different tool from the electromagnetic imager tool.

15. The method of claim 1, further comprising:
disposing the electromagnetic imager tool in the wellbore; and
operating the electromagnetic imager tool in the wellbore to gather the tool measurements by logging the wellbore.

16. A system comprising:
one or more processors; and
at least one computer-readable storage medium having stored therein instructions which, when executed by the one or more processors, cause the one or more processors to perform operations comprising:
gathering tool measurements made by an electromagnetic imager tool operating to log a wellbore in a formation;
decomposing the tool measurements into two quantities along a plurality of candidate mud angles for the electromagnetic imager tool, wherein values of the two quantities vary along the plurality of candidate mud angles;
identifying a mud angle associated with the electromagnetic imager tool from the plurality of candidate mud angles, wherein the identified mud angle is the candidate mud angle having a smallest amount of correlation between the two quantities decomposed from the tool measurements for each of the plurality of candidate mud angles; and
processing one or more images generated from the tool measurements by applying a mud effect removal process to the tool measurements using the identified mud angle.

17. The system of claim 16, wherein the electromagnetic imager tool is further configured to gather the measurements by logging the wellbore when the electromagnetic imager tool is disposed in the wellbore.

18. A non-transitory computer-readable storage medium having stored therein instructions which, when executed by a processor, cause the processor to perform operations comprising:
gathering tool measurements made by an electromagnetic imager tool operating to log a wellbore in a formation;
decomposing the tool measurements into two quantities along a plurality of candidate mud angles for the electromagnetic imager tool, wherein values of the two quantities vary along the plurality of candidate mud angles;
identifying a mud angle associated with the electromagnetic imager tool from the plurality of candidate mud angles, wherein the identified mud angle is the candidate mud angle having a smallest amount of correlation between the two quantities decomposed from the tool measurements for each of the plurality of candidate mud angles; and
processing one or more images generated from the tool measurements by applying a mud effect removal process to the tool measurements using the identified mud angle.

* * * * *